United States Patent
Munshi et al.

(10) Patent No.: US 8,091,536 B2
(45) Date of Patent: Jan. 10, 2012

(54) METHOD AND APPARATUS OF FUELLING AN INTERNAL COMBUSTION ENGINE WITH HYDROGEN AND METHANE

(75) Inventors: Sandeep Munshi, Vancouver (CA); Gordon P. McTaggart-Cowan, Derby (GB); Steven N. Rogak, Vancouver (CA); William Kendal Bushe, Vancouver (CA)

(73) Assignee: Westport Power Inc., Vancouver, BC (CA)

( * ) Notice: Subject to any disclaimer, the term of this patent is extended or adjusted under 35 U.S.C. 154(b) by 328 days.

(21) Appl. No.: 12/235,084

(22) Filed: Sep. 22, 2008

(65) Prior Publication Data

US 2009/0120385 A1    May 14, 2009

Related U.S. Application Data

(63) Continuation of application No. PCT/CA2007/000431, filed on Mar. 13, 2007.

(51) Int. Cl.
*F02B 13/00* (2006.01)
*F02M 21/02* (2006.01)

(52) U.S. Cl. ........................ 123/575; 123/525
(58) Field of Classification Search .......... 123/3, 27 GE, 123/525, 526, 575
See application file for complete search history.

(56) References Cited

U.S. PATENT DOCUMENTS

| | | | |
|---|---|---|---|
| 4,742,801 A | 5/1988 | Kelgard | |
| 5,787,864 A | 8/1998 | Collier | |
| 6,484,699 B2* | 11/2002 | Paul et al. | 123/525 |
| 6,659,071 B2 | 12/2003 | LaPointe et al. | |
| 2004/0003781 A1* | 1/2004 | Yuki et al. | 123/25 C |

FOREIGN PATENT DOCUMENTS

| | | |
|---|---|---|
| CA | 2524146 A1 | 3/2006 |
| EP | 1559886 A2 | 8/2005 |
| JP | 2119642 A1 | 5/1990 |
| WO | 95/27845 A1 | 10/1995 |
| WO | 2005/031142 A1 | 4/2005 |

OTHER PUBLICATIONS

WO 2006/122427, Ancimer et al., Nov. 23, 2006.*
J. B. Heywood, "Internal Combustion Engine Fundamentals", 1988, McGraw-Hill, New York, pp. 508-511.

(Continued)

*Primary Examiner* — Noah Kamen
(74) *Attorney, Agent, or Firm* — McAndrews, Held & Malloy, Ltd.

(57) ABSTRACT

A gaseous-fuelled internal combustion engine and a method of engine operation improve combustion stability and reducing emissions of NOx, PM, and unburned hydrocarbons. The method comprises fuelling an internal combustion engine with hydrogen and natural gas, which can be directly injected into the combustion chamber together or introduced separately. Of the total gaseous fuel delivered to the engine, at least 5% by volume at standard temperature and pressure is hydrogen. For at least one engine operating condition, the ratio of fuel rail pressure to peak in-cylinder pressure is at least 1.5:1. A fuel injection valve introduces the gaseous fuel mixture directly into the combustion chamber. Two separate fuel injection valves could also introduce the methane and hydrogen separately. An electronic controller controls timing for operating the fuel injection valve(s). The engine has a preferred compression ratio of at least 14:1.

46 Claims, 12 Drawing Sheets

OTHER PUBLICATIONS

M.R. Swain, M.J. Yusuf, Z. Dulger and M.N. Swain, "The Effects of Hydrogen Addition on Natural Gas Engine Operation", SAE Technical Paper 932775, 1993.

G.A. Karim, I. Wierzba and Y. Al-Alousi, "Methane-Hydrogen Mixtures as Fuels", International Journal of Hydrogen Energy, 1996, vol. 21 No. 7, pp. 625-631.

C.G. Fotache, T.G. Kreutz and C.K. Law, "Ignition of Hydrogen-Enriched Methane by Heated Air", Combustion and Flame, 1997, vol. 110, pp. 429-440.

J.F. Larsen and J.S. Wallace, "Comparisons of Emissions and Efficiency of a Turbocharged Lean-Burn Natural Gas and Hythane-Fuelled Engine", ASME Journal of Engineering for Gas Turbines and Power, 1997, vol. 119, pp. 218-226.

R. Sierens and E. Rousseei, "Variable Composition Hydrogen/Natural Gas Mixtures for Increased Engine Efficiency and Decreased Emissions", ASME Journal of Engineering for Gas Turbines and Power, 2000, vol. 122, pp. 135-140.

S. Allenby, W-C. Chang, A. Megaritis and M.L. Wyszynski, "Hydrogen Enrichment: A Way to Maintain Combustion Stability in a Natural Gas Fuelled Engine with Exhaust Gas Recirculation, the Potential of Fuel Reforming", Proceedings of the Institution of Mechanical Engineers, Part D., 2001, vol. 215, pp. 405-418.

C.G. Bauer and T.W. Forest, "Effect of hydrogen addition on the performance of methane-fuelled vehicles. Part I: effect on S.I. engine performance", International Journal of Hydrogen Energy, 2001, vol. 26, pp. 55-70.

S.O. Akansu, Z. Dulger, N. Kahraman and T. Veziroglu, "Internal Combustion Engines Fuelled by Natural Gas-Hydrogen Mixtures", International Journal of Hydrogen Energy, 2004, vol. 29, pp. 1527-1539.

S.R. Munshi, C. Nedelcu, J. Harris, et al., "Hydrogen Blended Natural Gas Operation of a Heavy Duty Turbocharged Lean Burn Spark Ignition Engine", SAE Technical Paper 2004-01-2956, 2004.

K. Collier, N. Mulligan, D. Shin and S. Brandon, "Emission Results from the New Development of a Dedicated Hydrogen-Enriched Natural Gas Heavy-Duty Engine", SAE Technical Paper 2005-010235, 2005.

Karim, G.A. et al., "Methane-hydrogen mixtures as fuels", International Journal of Hydrogen Energy, Elsevier Science Publishers B.V., Barking, GB, vol. 21, No. 7, Jul. 1, 1996.

Bauer, C.G. et al., "Effect of hydrogen addition on the performance of methane-fueled vehicles. Part I: effect on S.I. engine performance", International Journal of Hydrogen Energy, Elsevier Science Publishers B.V., Barking, GB vol. 1. 26, No. 1, Jan. 1, 2001, pp. 55-70.

Akansu, S.O. et al., "Internal combustion engines fueled by natural gas-hydrogen mixtures", International Journal of Hydrogen Energy, Elsevier Science Publishers B.V., Barking, GB, vol. 29, No. 14, Nov. 1, 2004, pp. 1527-1539.

Collier, K. et al., "Emission results from the new development of a dedicated hydrogen—enriched natural gas heavy duty engine", SAE Technical Paper Series, Society of Automotive Engineers, Warrendale, PA, No. 2005-01-0235, Apr. 11, 2005, pp. 1-7.

Munshi, S. et al., "Hydrogen blended natural gas operation of a heavy duty turbocharged lean burn spark ignition engine", SAE Technical Paper Series, Society of Automotive Engineers, Warrendale, PA, US, No. 2004-01-2956, Oct. 25, 2004, pp. 1-17.

* cited by examiner

METHOD AND APPARATUS OF FUELLING AN INTERNAL COMBUSTION ENGINE WITH HYDROGEN AND METHANE

CROSS-REFERENCE TO RELATED APPLICATION(S)

This application is a continuation of International Application No. PCT/CA2007/000431, having an international filing date of Mar. 13, 2007, entitled "Method And Apparatus Of Fuelling An Internal Combustion Engine With Hydrogen And Methane". The '431 international application claimed priority benefits, in turn, from Canadian Patent Application No. 2,539,711 filed Mar. 31, 2006. The '431 international application is hereby incorporated by reference herein in its entirety.

FIELD OF THE INVENTION

The present invention relates to a method and apparatus of fuelling a diesel-cycle internal combustion engine with hydrogen and methane to improve combustion stability and reduce emissions of nitrogen oxides (NOx), unburned hydrocarbons and particulate matter (PM).

BACKGROUND OF THE INVENTION

Because gaseous fuels such as natural gas, propane, hydrogen, and blends thereof are cleaner burning fuels compared to liquid fuels such as diesel, recent attention has been directed to developing engines that can burn such fuels while matching the power and performance that engine operators are accustomed to expecting from diesel engines.

Natural gas fuelled engines that use lean-burn spark-ignition ("LBSI") introduce the fuel into the intake air manifold or intake ports at relatively low pressures. To avoid engine knock caused by the premature detonation of the fuel inside the combustion chamber, such engines typically operate with a compression ratio no greater than about 12:1, which is lower compared to diesel-cycle engines which have compression ratios of at least 14:1, and this affects engine performance and efficiency. Consequently, while the exhaust gases from the combustion chambers of LBSI engines can have lower emissions of NOx, and PM compared to an equivalently sized diesel engine, such LBSI engines also have lower performance and energy efficiency, which means that to do the same amount of work, more fuel is consumed on an energy basis, and to match the full range of power and performance of a diesel engine, a larger LBSI engine is needed.

Recently, research has been directed towards blending natural gas and hydrogen for use in homogeneous charge, spark-ignition engines. Representative publications relating to such research include, "The Effects of Hydrogen Addition On Natural Gas Engine Operation", SAE Technical Paper 932775, by M. R. Swain, M. J. Yusuf, Z. Dulger and M. N. Swain, which was published by the Society of Automotive Engineers ("SAE") in 1993; "Variable Composition Hydrogen/Natural Gas Mixtures for Increased Engine Efficiency and Decreased Emissions", ASME Journal of Engineering for Gas Turbines and Power, Vol. 122, pp. 135-140, by R. Sierens and E. Rousseel, published in 2000; "Hydrogen Blended Natural Gas Operation of a Heavy Duty Turbocharged Lean Burn Spark Ignition Engine", SAE Technical Paper 2004-01-2956, by S. R. Munshi, C. Nedelcu, J. Harris, et al., published in 2004; "Hydrogen Enrichment: A Way to Maintain Combustion Stability in a Natural Gas Fuelled Engine with Exhaust Gas Recirculation, the Potential of Fuel Reforming", Proceedings of the Institution of Mechanical Engineers, Part D. Vol. 215 2001, pp. 405-418, by S. Allenby, W-C. Chang, A. Megaritis and M. L. Wyszynski; "Emission Results from the New Development of a Dedicated Hydrogen-Enriched Natural Gas Heavy-Duty Engine", SAE Technical Paper 2005-010235, by K. Collier, N. Mulligan, D. Shin, and S. Brandon which was published in 2005; "Comparisons of Emissions and Efficiency of a Turbocharged Lean-Burn Natural Gas and Hythane-Fuelled Engine", ASME Journal of Engineering for Gas Turbines and Power, Vol. 119, 1997, pp. 218-226, by J. F. Larsen and J. S. Wallace; "Effect of hydrogen addition on the performance of methane-fuelled vehicles. Part I: effect on S.I. engine performance", International Journal of Hydrogen Energy, Vol. 26. 2001, pp. 55-70, by CG. Bauer and T. W. Forest; "Methane-Hydrogen Mixtures as Fuels", International Journal of Hydrogen Energy, Vol. 21 No. 7, 1996, pp. 625-631, by G. A. Karim, I. Wierzba and Y. Al-Alousi; and "Internal Combustion Engines Fuelled by Natural Gas-Hydrogen Mixtures", International Journal of Hydrogen Energy, Vol. 29, 2004, pp. 1527-1539, by S. O. Akansu, Z. Dulger, N. Kahraman and T. Veziroglu. The results reported in these papers have shown that at stoichiometric operation, the addition of hydrogen tends to reduce power density and increase NOx, while slightly reducing hydrocarbon and carbon monoxide emissions. A more significant effect is reported under lean premixed conditions, where a substantial increase in the lean limit is observed. This has been attributed to enhanced combustion rate and shorter ignition delay. For a given air-fuel ratio, NOx emissions are higher with hydrogen addition, due to the higher flame temperature, while CO and unburned hydrocarbons are substantially reduced. However, due to hydrogen's ability to extend the lean limit, lower NOx emissions can be achieved by running at leaner air-fuel ratios with hydrogen addition. Flame stability in the presence of exhaust gas recirculation (EGR) is also improved. Efficiency effects can depend upon the tested operating condition, with some studies such as those reported in the Swain, Sierens, and Akansu papers, showing improved efficiency with hydrogen addition and other studies, such as those reported in the Larsen and Bauer papers, showing reduced efficiency. Such contradictory results show that while a considerable amount of research has been done to investigate the effects of blending natural gas and hydrogen for use in homogeneous charge spark-ignition engines, the combustion process is complex, that the effect of combusting such fuel mixtures in an engine can be very dependent upon the engine operating conditions, and that the effect of adding hydrogen and the magnitude or such effects, if any, are not obvious or easy to predict. Furthermore, all of the published papers referenced herein relate to homogeneous charge spark-ignition engines, and while some laboratory experiments have been reported, such as shock-tube studies and non-premixed counterflow methane/heated air jet experiments, the inventors are not aware of any publications relating to experiments involving fuelling a direct injection internal combustion engine with a blended fuel mixture comprising methane and hydrogen.

Engines that are capable of injecting a gaseous fuel directly into the combustion chamber of a high compression internal combustion engine are being developed, but are not yet commercially available. Engines fuelled with natural gas that use this approach can substantially match the power, performance and efficiency characteristics of a diesel engine, but with lower emissions of NOx, unburned hydrocarbons, and PM. NOx are key components in the formation of photochemical smog, as well as being a contributor to acid rain. PM emissions, among other detrimental health effects, have been linked to increased cardiovascular mortality rates and impaired lung development in children. However, with direct injection engines that are fuelled with natural gas, it has been found that there is a trade-off between NOx emissions and emissions of unburned hydrocarbons and PM. That is, later timing for injecting the natural gas is beneficial for reducing NOx but results in higher emissions of unburned hydrocarbons and PM. Environmental regulatory bodies in North America and around the world have legislated substantial reductions in NOx and PM emissions from internal combustion engines. As a result, because it is necessary to reduce the emissions of each one of NOx, PM and unburned hydrocarbons, for a direct injection engine fuelled with natural gas, the higher PM emissions associated with later combustion timing effectively limits how much the timing for fuel injection can be retarded.

Since published technical papers have reported that under specific operating conditions there can be benefits arising from fuelling a homogeneous charge, spark-ignition engine with a gaseous fuel mixture comprising methane and hydrogen, and since environmental regulatory bodies have legislated substantial reductions in NOx and PM emissions from internal combustion engines, and since the combustion process is complex and the effect of adding hydrogen to a fuel mixture delivered to a direct injection internal combustion engine is unpredictable, there is a need to determine whether it is possible to improve combustion stability and reduce engine emissions by fuelling a direct injection internal combustion engine with hydrogen and natural gas, and if so, the method of operating a direct injection engine that is fuelled with such fuels to achieve improvements in combustion stability and reductions in engine emissions.

SUMMARY OF THE INVENTION

A method of operating a direct injection internal combustion engine comprises introducing a gaseous fuel mixture directly into a combustion chamber of the engine. The gaseous fuel mixture comprises methane and between 5% and 60% hydrogen by volume at standard temperature and pressure. For at least one engine operating condition, the method comprises maintaining a fuel rail to peak in-cylinder pressure ratio of at least 1.5:1 when introducing the gaseous fuel mixture into the combustion chamber. A preferred embodiment of the method comprises maintaining a fuel rail to peak in-cylinder pressure ratio of at least 1.5:1 when introducing the gaseous fuel mixture into the combustion chamber for all engine operating conditions. When the constituent parts of the gaseous fuel mixture are described herein as percentages by volume, unless noted otherwise this is defined to be the percentage by volume at standard temperature and pressure (STP).

In preferred methods, the gaseous fuel mixture can comprise between 10% and 50%, between 15% and 40% hydrogen by volume, or between 20% and 35% hydrogen by volume at standard temperature and pressure. The methane can be a constituent part of natural gas. The method can further comprise premixing the gaseous fuel mixture and storing it as a blended fuel within a storage tank from which it can be delivered to the engine. In a preferred method, methane is the largest constituent of the gaseous fuel mixture by volume at standard temperature and pressure.

The method can further comprise controlling fuel injection timing so that the mid-point of integrated combustion heat release occurs between 2 and 30 crank angle degrees after top dead center. An advantage of adding hydrogen to natural gas is that the combustion timing can be delayed to a later time in the combustion cycle compared to an engine that is fuelled with natural gas alone. A preferred method comprises controlling fuel injection timing so that in at least one engine operating condition the mid-point of integrated combustion heat release occurs between 5 and 15 crank angle degrees after top dead center.

The method can comprise introducing a pilot fuel to assist with ignition of the gaseous fuel mixture. A preferred method comprises injecting a pilot fuel directly into the combustion chamber about 1 millisecond before start of injection of the gaseous fuel mixture. The pilot fuel can be a liquid fuel with a cetane number between 40 and 70. A pilot fuel with a cetane number between 40 and 50 is preferred in most cases, with conventional road grade diesel being a suitable fuel with a cetane number in this range. Over an engine operating map the pilot fuel is on average between 3% and 10% of the fuel that is consumed by the engine on an energy basis, and more between 4% and 6%. The pilot fuel is more easily ignited compared to the gaseous fuel mixture, and the pilot fuel ignites first to trigger the ignition of the gaseous fuel mixture. Because the gaseous fuel mixture is preferably cleaner burner than the pilot fuel, the pilot fuel preferably represents only a small portion of the fuel that is consumed by the engine on an energy basis.

Instead of employing a pilot fuel, the method can comprise heating a hot surface inside the combustion chamber to assist with igniting the gaseous fuel mixture. In a preferred method the hot surface is provided by a glow plug and the method further comprises electrically heating the glow plug. In yet another embodiment, the method can comprise spark igniting the gaseous fuel mixture inside the combustion chamber.

The method can further comprise storing the hydrogen separately from the methane and mixing the hydrogen and methane to form the gaseous fuel mixture. The method can further comprise controlling the proportions of hydrogen and methane in the gaseous fuel mixture as a function of engine operating conditions.

The method can further comprise maintaining a fuel rail to peak in-cylinder pressure ratio of at least 2:1 when introducing the gaseous fuel mixture into the combustion chamber for at least one engine operating condition. Preferred methods comprise maintaining a choked flow condition at a nozzle orifice of a fuel injection valve when introducing the gaseous fuel mixture into the combustion chamber. While experiments have proven that satisfactory engine operation can be achieved by injecting the gaseous fuel mixture into the combustion chamber with an injection pressure that is at least 16 MPa (about 2350 psia), higher fuel injection pressures of at least 20 MPa (about 2900 psia) are more preferred.

According to the method, in the course of a compression stroke, an intake charge inside the combustion chamber is compressed by a ratio of at least about 14:1. Compression ratios higher than 14:1 are associated with diesel-cycle engines, which can deliver higher performance and efficiency than conventional Otto-cycle engines, otherwise known as spark-ignition engines, which use a pre-mixed homogeneous charge which limits them to lower compression ratios to avoid engine knock.

In another preferred method of fuelling an internal combustion engine, the method comprises introducing a gaseous fuel mixture directly into a combustion chamber of the engine, wherein the gaseous fuel mixture comprises methane, introducing hydrogen into the combustion chamber, thereby adding hydrogen to the gaseous fuel mixture, wherein the hydrogen represents at least 5% by volume of the gaseous fuel mixture at standard temperature and pressure; and maintaining a gaseous fuel mixture rail to peak in-cylinder pressure ratio of at least 1.5:1 when introducing the gaseous fuel mixture into the combustion chamber for at least one engine operating condition. That is, the hydrogen can be introduced into the combustion chamber separately from the gaseous fuel mixture and becoming part of the gaseous fuel mixture inside the combustion chamber or the method can comprise premixing the hydrogen with the gaseous fuel mixture comprising methane, and introducing the gaseous fuel mixture and the hydrogen directly into the combustion chamber. In further embodiments, the method can comprise premixing the hydrogen with intake air and introducing the hydrogen into the combustion chamber during an intake stroke of the piston or introducing the hydrogen directly into the combustion chamber separately from the gaseous fuel mixture.

An internal combustion engine is provided that can be fuelled with a gaseous fuel mixture comprising methane and between 5% and 60% hydrogen by volume at standard temperature and pressure. The disclosed engine comprises a combustion chamber defined by a cylinder, a cylinder head, and a piston movable within the cylinder; a fuel injection valve with a nozzle that is disposed within the combustion chamber, the fuel injection valve being operable to introduce the gaseous fuel mixture directly into the combustion chamber; a pressurizing device and piping for delivering the gaseous fuel mixture to the injection valve with a ratio of fuel rail to peak in-cylinder pressure being at least 1.5:1 for at least one engine operating condition; and, an electronic controller in communication with an actuator for the fuel injection valve for controlling timing for operating the fuel injection valve. The engine preferably has a compression ratio of at least 14.

The electronic controller is preferably programmable to time introduction of the gaseous fuel mixture into the combustion chamber so that the mid-point of an integrated combustion heat release occurs between 2 and 30 crank angle degrees after top dead center, and in another embodiment, between 5 and 15 crank angle degrees after top dead center.

The fuel injection valve can be mounted in the cylinder head with the fuel injection valve comprising a nozzle disposed within the combustion chamber. The engine can further comprise a second fuel injection valve that is operable to introduce a pilot fuel directly into the combustion chamber. The second fuel injection valve can be integrated into a valve assembly that also comprises the fuel injection valve for introducing the gaseous fuel mixture. The second fuel injection valve and the fuel injection valve for introducing the gaseous fuel mixture are preferably independently actuated and the gaseous fuel mixture is injectable into the combustion chamber through a first set of nozzle orifices, which are different from a second set of nozzle orifices through which the pilot fuel is injectable into the combustion chamber.

Instead of employing a second fuel injection valve to introduce a pilot fuel to assist with ignition of the gaseous fuel mixture, the engine can comprise an ignition plug disposed within the combustion chamber that is operable to assist with ignition of the gaseous fuel mixture. The ignition plug can be a glow plug that is electrically heatable to provide a hot surface for assisting with ignition of the gaseous fuel mixture or the ignition plug can be a spark plug.

The engine can further comprise a storage vessel for storing the gaseous fuel mixture in a substantially homogeneous mixture with predetermined proportions of hydrogen and methane. In another embodiment, the engine can comprise a first storage vessel within which the hydrogen can be stored, a second storage vessel within which a gaseous fuel comprising methane can be stored, and valves associated with each one of the first and second storage vessel that are operable to control respective proportions of hydrogen and methane in the gaseous fuel mixture that is introducible into the combustion chamber. If the hydrogen is stored separately from the gaseous fuel mixture that comprises methane, then the electronic controller can be programmable to change respective proportions of hydrogen and methane in the gaseous fuel mixture to predetermined amounts responsive to detected engine operating conditions.

Another embodiment of an internal combustion engine is provided that can be fuelled with a gaseous fuel mixture comprising methane and hydrogen. In this embodiment, the engine comprises a combustion chamber defined by a cylinder, a cylinder head, and a piston movable within the cylinder; a first fuel injection valve with a nozzle disposed within the combustion chamber, wherein the fuel injection valve is operable to introduce methane directly into the combustion chamber; a second fuel injection valve with a nozzle disposed within an intake air manifold, wherein the second fuel injection valve is operable to introduce hydrogen into the intake air manifold from which the hydrogen can flow into the combustion chamber; and an electronic controller in communication with an actuator for each one of the first and second fuel injection valves for controlling respective timing for operating the first and second fuel injection valves. In this embodiment, the engine can further comprise a pressurizing device and piping for delivering the methane to the first injection valve with a ratio of fuel rail pressure to peak in-cylinder pressure being at least 1.5:1 for at least one engine operating condition. Like the other embodiments, the engine preferably has a compression ratio of at least 14:1, and compression ratios as high as 25:1 are possible as well as ratios therebetween, such as 18:1, 20:1 and 22:1.

DETAILED DESCRIPTION OF PREFERRED EMBODIMENT(S)

Figure 1:
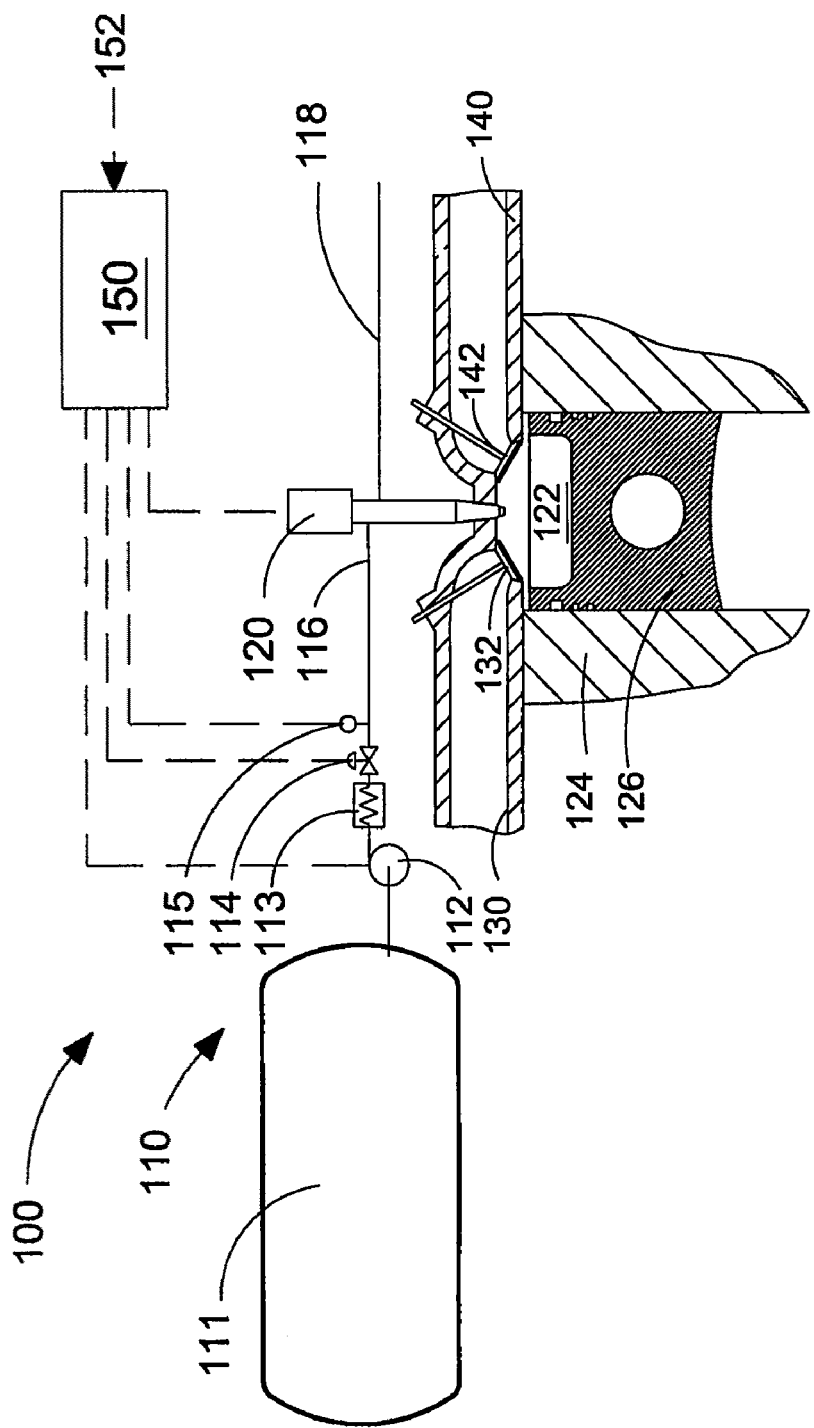
FIG. 1 is a schematic drawing illustrating an apparatus for direct injection of a gaseous fuel mixture into the combustion chamber of an internal combustion engine.

FIG. 1 is a schematic drawing of engine apparatus 100, which is adapted to be fuelled with a gaseous fuel mixture comprising methane and hydrogen. Fuel storage system 110 comprises storage vessel 111, which is made to store the compressed gaseous fuel mixture. In the illustrated embodiment, the pre-mixed gaseous fuel mixture can be stored in storage vessel 111, which is rated to store the compressed gaseous fuel mixture at a predetermined storage pressure. Storage vessel 111 is designed to comply with local regulations which can specify safety factors for ensuring containment of the gaseous fuel mixture even in the event of impact, for example if storage vessel 111 is a vehicular fuel tank that could be involved in a vehicle collision. In addition to safety factors and design strength requirements, local regulations typically impose a maximum storage pressure. Compressor 112 is operable to deliver the gaseous fuel mixture from storage vessel 111 to fuel injection valve 120, via aftercooler 113 and gaseous-fuel supply rail 116. Aftercooler 113 cools the gaseous fuel mixture after it has been compressed by compressor 112. Aftercooler 113 can be a heat exchanger with the cooling fluid being engine coolant diverted from the engine cooling system. In a preferred embodiment, the fuel supply system is a common rail system, meaning that the gaseous fuel is delivered to fuel injection valve assembly 120 at injection pressure. In such a common rail system, pressure sensor 115 can be employed to measure the fuel pressure in gaseous-fuel supply rail 116 so that compressor 112 can be operated to maintain gaseous fuel injection pressure between a predetermined low and high set point.

In a preferred embodiment, a liquid pilot fuel is also directly injected into combustion chamber 122 to assist with igniting the gaseous fuel mixture. In such an embodiment, injection valve assembly 120 can comprise two separate valve needles that are independently operable, with one valve needle controlling the injection of a gaseous fuel mixture and the second valve needle controlling the injection of the liquid pilot fuel. Pilot fuel is deliverable to fuel injection valve assembly 120 from pilot fuel rail 118. Pilot fuel can be delivered to pilot fuel rail 118 at injection pressure by a conventional diesel common rail fuel supply system (not shown).

Fuel injection valve 120 introduces the gaseous fuel mixture directly into combustion chamber 122, which is generally defined by a bore provided in cylinder block 124, the cylinder head, and piston 126, which is movable up and down within the bore. The flow of air into combustion chamber 122 from intake air manifold 130 is controlled by intake valve 132, which can be opened during intake strokes of piston 126. Like conventional diesel engines, the disclosed engine can employ a turbocharger (not shown) to pressurize the intake air or the engine can be naturally aspirated. Combustion products can be expelled from combustion chamber 122 into exhaust manifold 140 through exhaust valve 142, which can be opened during exhaust strokes of piston 126.

Electronic controller 150 is programmable to control the operation of compressor 112 and control valve 114 to control the pressure of the gaseous fuel mixture in gaseous fuel supply rail 116. Controller 150 is also programmable to command the timing for opening and closing of the fuel injection valve needles that respectively control the injection of the gaseous fuel mixture and the pilot fuel. For example, electronic controller 150 can be programmed to control the pilot fuel injection valve so that the pilot fuel is introduced about 1 millisecond before the gaseous fuel injection valve is commanded to open. Furthermore, electronic controller 150 can be programmed to time the opening and closing of the gaseous fuel injection valve. The fuel injection timing can be predetermined responsive to the engine operating conditions determined from measured parameters that are inputted into electronic controller 150, and the input of such parameters is represented by arrow 152.

Figure 2:
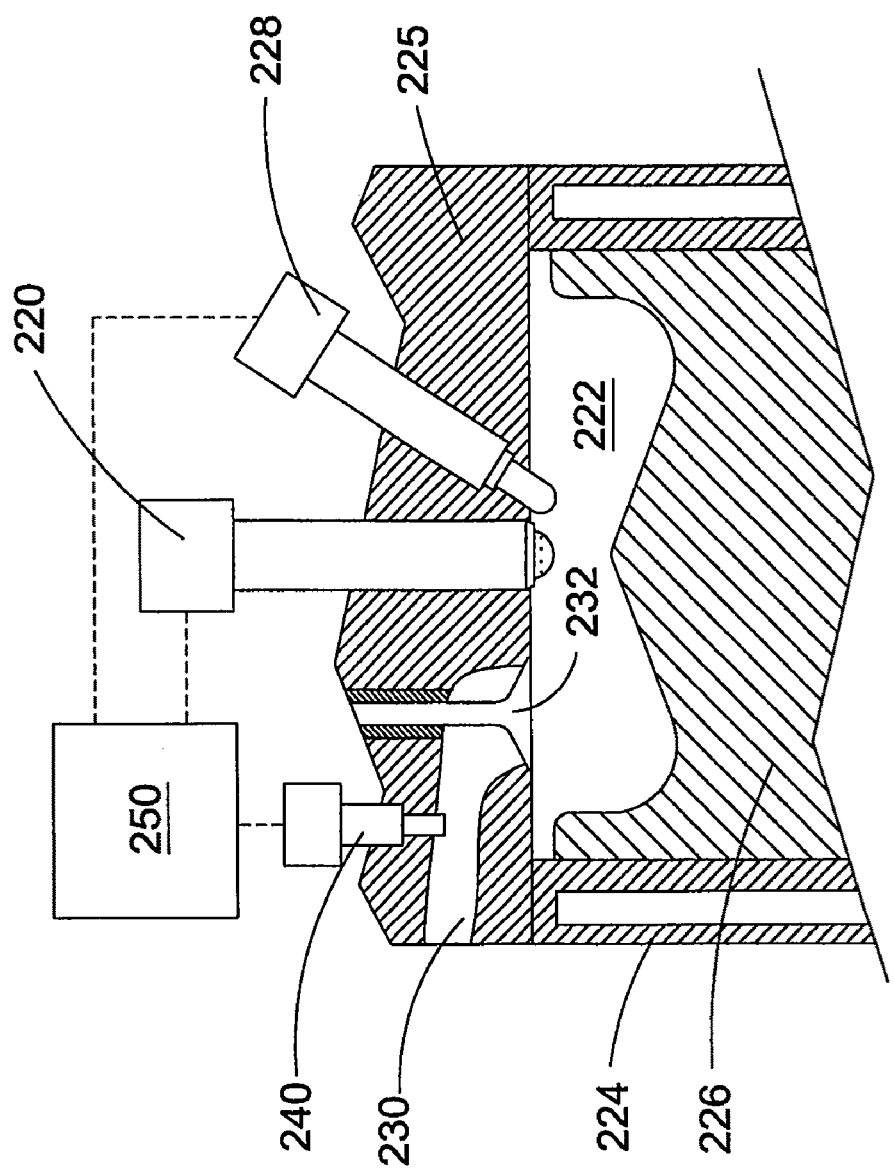
FIG. 2 is a schematic drawing illustrating a second embodiment of an apparatus for direct injection of a gaseous fuel mixture into the combustion chamber of an internal combustion engine.

FIG. 2 is a schematic drawing of another preferred embodiment for an engine apparatus that is adapted to be fuelled with a gaseous fuel mixture comprising methane and hydrogen. In this embodiment, fuel injection valve 220 injects only the gaseous fuel mixture into combustion chamber 222. A pilot fuel is not required by this engine because ignition assistance is provided by ignition plug 228. Ignition plug 228 can be an electrically heated glow plug that is adapted for sustained operation during engine operation. This is unlike a conventional glow plug, which is normally activated only under certain engine conditions such as start-up when the engine block is below a predetermined temperature. Compared to an engine that is fuelled with natural gas without added hydrogen, an advantage of using a gaseous fuel mixture comprising hydrogen is that because hydrogen is easier to ignite compared to natural gas, the glow plug temperature can be kept at a lower temperature compared to the temperature that is needed to assist with ignition of natural gas which is not mixed with hydrogen. This is advantageous because lower glow plug temperatures are generally associated with improved durability and longer service life. In yet another embodiment (not shown), the ignition plug can be a spark plug.

In the illustrated embodiment of FIG. 2, other than using ignition plug 228 to assist initiating fuel combustion instead of a pilot fuel, the shown engine apparatus is essentially the same. That is, a bore in cylinder block 224, cylinder head 225, and piston 226, which is movable up and down within the cylinder bore, all cooperate to define combustion chamber 222. Air can flow into combustion chamber 222 through intake air manifold 230 when intake valve 232 is open and electronic controller 250 is programmable to control the timing for opening and closing fuel injection valve 220, and to control the temperature of ignition plug 228.

FIG. 2 also shows an optional secondary fuel injection valve 240 which can be employed to inject some of the gaseous fuel into the intake air manifold. A port fuel injection valve is shown, but a single fuel injection valve can be disposed further upstream in the intake air manifold for introducing gaseous fuel into all of the combustion chambers. Secondary fuel injection valve 240 can be employed to introduce hydrogen into the combustion chamber separately from a gaseous fuel mixture comprising methane, such as natural gas. With such an embodiment, the methane and hydrogen mixes inside the combustion chamber, but with the hydrogen more evenly dispersed within the combustion chamber. An advantage of this arrangement is that the hydrogen need not be compressed to as high a pressure as it would need to be pressurized for direct injection. Another advantage is that separately injecting the methane and hydrogen allows the proportions of each fuel to be adjusted for different engine operating conditions. However, a disadvantage of this approach is that a secondary fuel injection valve adds complexity and capital and maintenance costs to the engine.

Figure 2A:
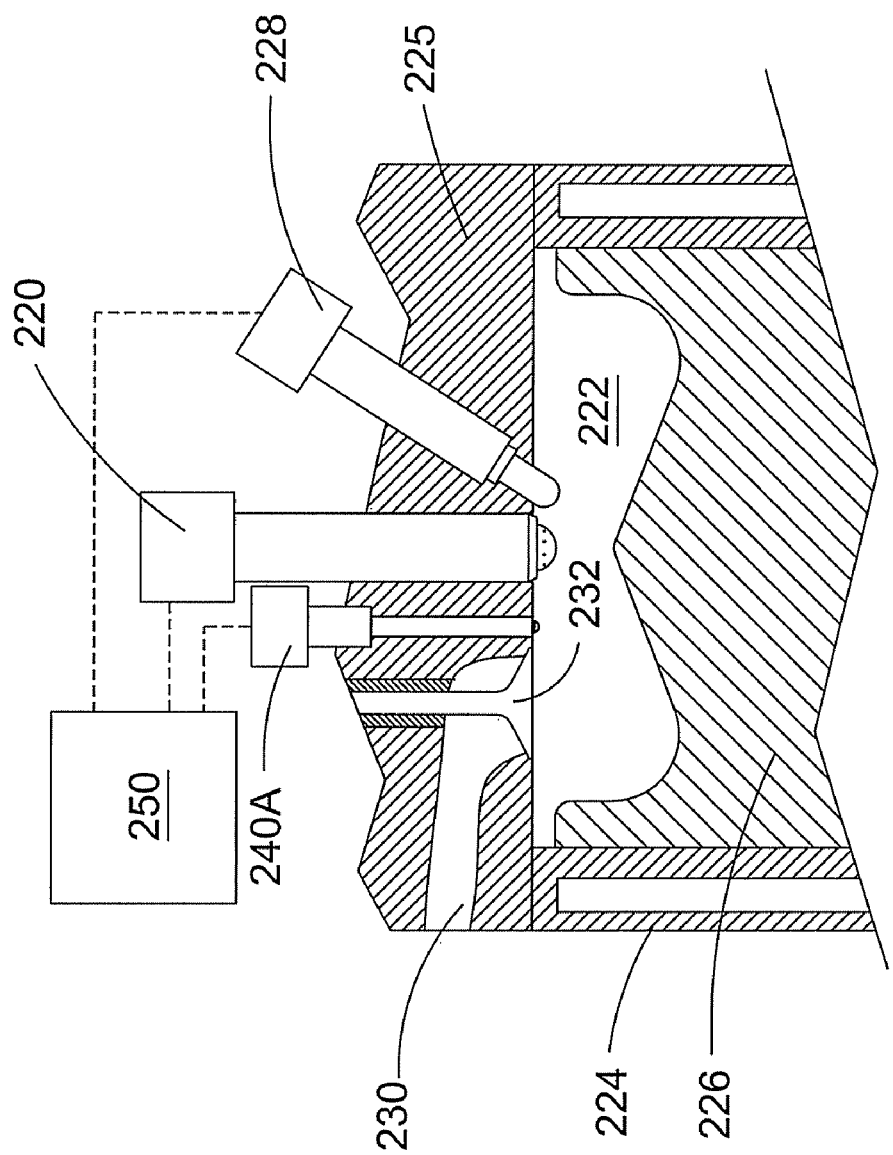
FIG. 2A is a schematic drawing illustration of an embodiment of an apparatus for direct injection of a gaseous fuel mixture into the combustion chamber, where separate fuel injections valves are used to introduce the methane and hydrogen.

FIG. 2A is a schematic drawing illustration of an embodiment of an apparatus for direct injection of a gaseous fuel mixture into the combustion chamber. The embodiment of FIG. 2A is similar to that of FIG. 2, except that separate fuel injections valves 228 and 240A are used to directly inject methane and hydrogen, respectively, into the combustion chamber 222.

To determine a desired method of operating an internal combustion engine with direct injection of a gaseous fuel mixture comprising methane and hydrogen, experiments were conducted using a single cylinder engine. The single cylinder engine was a Cummins™ ISX series heavy-duty six-cylinder, four stroke, direct injection diesel engine, modified to operate on only one cylinder. The engine was further adapted for gaseous fuel operation using Westport™ fuel injection and fuel supply systems. The engine cylinder bore diameter was 137 millimeters, the piston stroke was 169 millimeters, and the displacement of the single cylinder was about 2.5 liters. The connecting rod length was 261 millimeters and the compression ratio was 17:1.

Because the experimental engine was a single cylinder engine, the energy in the exhaust stream was too small to drive a turbocharger to compress the intake air. To simulate the conditions for a turbocharged engine, in the experiments an air compressor was provided for the combustion air supply. The air compressor was equipped with a refrigerated air dryer to remove water vapor (dew point −40° C.) and filters to remove contaminants. The EGR loop comprised an EGR cooler and a variable flow-control valve. Maintaining the exhaust stream pressure approximately 10 kPa above the intake pressure drove the recirculation of the exhaust gas.

The fuelling system provided gaseous fuel and diesel to the engine's internal fuelling rails. The fuel injection valve was a dual fuel injection valve operable to separately and independently inject the gaseous fuel mixture as the main fuel, and diesel fuel as the pilot fuel, with flow of the main and pilot fuels being controlled by two concentric valve needles. Separate solenoid actuated control valves were operable to control the actuation of each valve needle to control the timing and duration of the respective pilot and main fuel injection events. The pilot fuel injection valve comprised a nozzle with 7 orifices, and the gaseous fuel injection valve comprised a nozzle with 9 orifices, and the injection angle was 18 degrees below the firedeck. Two separate gaseous fuel supplies were used in the experiments. Commercial natural gas (~96 mol % $CH_4$, 2% $C_2H_6$, traces $N_2$, $CO_2$, $C_3H_8$ all <0.5%) was compressed externally and used as the reference gas. The hydrogen-methane blended gaseous fuel mixtures were purchased separately (certified standard, analytical accuracy ±2%), and were fed via a separate compression system to the engine. Low-sulfur (<500 ppm) road grade diesel that met Canadian General Standards Board specification CAN/CGSB-3.520 was used as the pilot fuel.

The gas flow rate was measured by a coriolis-type mass flowmeter (uncertainty of approximately 1% of full scale), which was insensitive to the composition of the gas passing through it. Diesel pilot flow was measured by a gravimetric system with an uncertainty of about 10% of full scale. Air supply was measured by a subsonic venturi with an estimated uncertainty of 3% of full scale. Cylinder pressure was measured with a flush-mounted water-cooled piezo-electric pressure transducer with an uncertainty of 1%, and correlated with crank angle (CA) by a shaft encoder with a Vi crank angle degree (° CA) resolution. Gaseous emissions were measured using a raw emissions bench equipped with infrared analyzers ($CO_2$— Beckmann, CO and $CH_4$—Siemens), a flame ionization detector (total unburned hydrocarbons (tHC)—Ratfisch), and a chemi-luminescent analyzer (NOx—Advanced Pollution Instruments). A second infrared analyzer (California Analytical) was used to measure the $CO_2$ concentration in the intake stream, from which the EGR fraction was determined. A chilled water separator removed water vapor (dew point −5° C.) upstream of the non-dispersive infrared instruments. Repeatability studies on the gaseous emissions sampling have shown uncertainties of 5% in NOx and 10% in tHC and CO, including both instrumentation uncertainty and variations in engine operating condition. Particulate matter was measured using a micro-dilution system, where a fraction of the exhaust stream was separated and diluted at a factor of 15:1. The particulate loading in this diluted sample was then measured either using a tapered element oscillating microbalance ("TEOM"), Rupprecht & Pataschnick Model 1105, or with gravimetric filters. Pallflex Emfab™ filters were used to collect the samples, and were then weighed (accuracy ±5 µg) to calculate the mass concentration in the exhaust stream. TEOM results were found to be, on average, 8% below the gravimetric filter readings (correlation coefficient 0.96). Where TEOM results are used in this work, they are identified by the caption "TEOM PM".

Due to the single cylinder engine's high internal friction, brake-performance parameters are not representative of the in-cylinder conditions. As a result, the engine operation was measured on the basis of the gross-indicated power—the integral of the in-cylinder pressure versus volume curve, over the compression and power strokes only, as defined in J. B. Heywood in "Internal Combustion Engine Fundamentals, published in 1988 by McGraw-Hill, New York. The gross-indicated power, normalized by engine speed and displaced volume, provided the gross-indicated mean effective pressure (GIMEP). The indicated power was used to normalize both fuel consumption and emissions measurements. The gross-indicated specific fuel consumption (GISFC) reported the total fuel mass flow, with the gaseous component represented as an equivalent mass of diesel on an energy basis (lower heating values: diesel, 42.8 MJ/kg; NG, 48.8 MJ/kg; 10% $H_2$, 50.6 MJ/kg; 23% $H_2$, 52.5 MJ/kg).

The in-cylinder pressure trace can also be used to estimate the net heat-release rate, as given by:

$$\frac{dQ_{net}}{d\theta} = \frac{\gamma}{\gamma-1} p \frac{dV}{d\theta} + \frac{1}{\gamma-1} V \frac{dp}{d\theta}$$

where θ is the crank angle, p is the in-cylinder pressure at a given crank angle, V is the cylinder volume at that point, and γ is the specific heat ratio ($c_p/c_v$—assumed constant). The net heat release rate represents the rate of energy release from the combustion processes less wall heat transfer and crevice flow losses. By integrating the heat-release rate up to a given crank-angle and normalizing by the total energy released over the full cycle, the fraction of the energy released up to that point in the cycle can be determined. The midpoint of this curve is 50% of the integrated heat release (50% IHR), and can be used to define the combustion timing.

The engine operation was also defined on the basis of the equivalence ratio (φ: ratio of actual to stoichiometric fuel/oxidizer ratio). The amount of dilution of the intake air is defined by the intake oxygen mass fraction ($Y_{intO2}$), which is 0.23 for undiluted air and decreases with increasing dilution (that is, increasing EGR). By specifying φ, 50% IHR, GIMEP, engine speed and the intake oxygen mass fraction, the engine's operating condition is fully defined.

The experimental test conditions selected for testing the gaseous fuel mixture comprising methane and hydrogen were based on a desire to reduce fuel consumption while increasing operating condition realism. Specifically, an operating condition with high emissions associated with natural gas operation was of interest, to determine how effectively hydrogen could enhance poor natural gas combustion. The selected operating condition had the following characteristics: a high EGR fraction, namely 40% by mass; an intake oxygen mass fraction ($Y_{intO2}$) of 0.175; an engine speed of 800 RPM; a low load, namely 6 bars gross indicated mean effective pressure ("GIMEP"); and, a moderate φ of 0.5 (oxygen-based). Experiments were conducted with a fuel injection pressure of 16 MPa and 20 MPa. Natural gas with a 94% methane concentration by volume was the source of methane for the gaseous fuel mixture, and mixtures with 10% hydrogen and 23% hydrogen by volume were tested. To establish influences over a range of conditions while minimizing the required changes to the operating condition, a range of combustion timings were used. By varying combustion timing, highly stable conditions (early timings) and very unstable conditions (late timings) could be tested at the same baseline (EGR, load, speed) condition. To improve experimental precision, it was decided to use a paired-testing approach, where a single point was tested using first natural gas and then the gaseous fuel mixture (or in the opposite order). By fixing the operating condition, then varying the timing, it was possible to minimize variations due to non-repeatability of the operating condition setpoint. Replication of timing sets was used to establish repeatability. Most of the testing was carried out with a fuel injection pressure of 16 MPa, to ensure that the commanded injection opening durations were repeatable (in excess of 0.9 ms). As this pressure is below the pressures typically used in other gaseous fuelled direct injection internal combustion engines, such as engines that are fuelled with 100% natural gas, a set of tests, with both natural gas and the gaseous fuel mixtures, were carried out at 20 MPa to ensure that the trends were not being influenced by this parameter.

Figure 3:
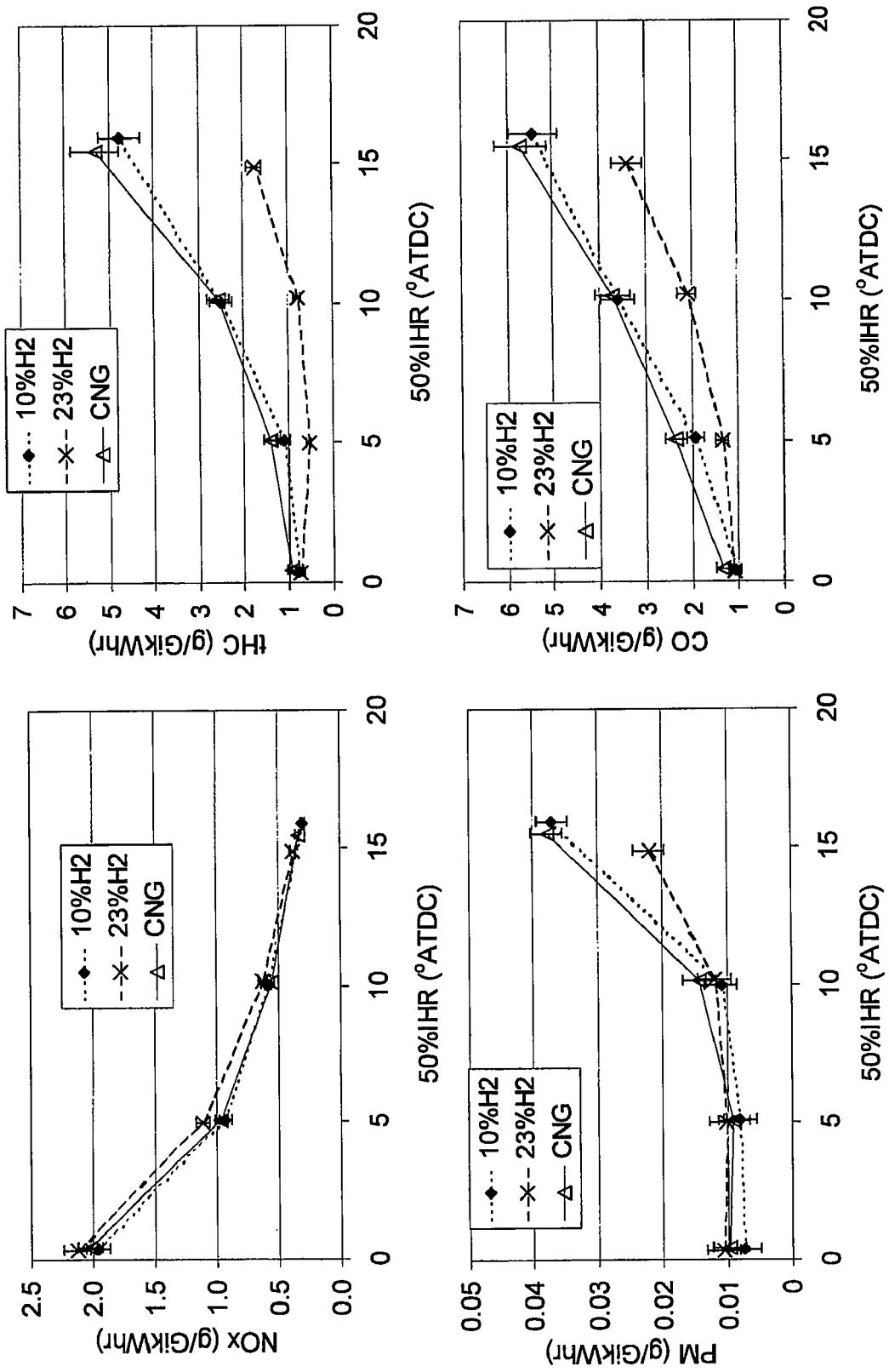
FIG. 3 shows four graphs that plot engine emissions against timing for the mid-point of a combustion heat release for an engine that is fuelled with 100% compressed natural gas, a gaseous fuel mixture of 10% hydrogen and 90% compressed natural gas, and 23% hydrogen and 77% compressed natural gas, with all percentages measured by volume. The plotted data was collected from an engine operating at 800 RPM, 6 bar GIMEP, 0.5φ, 40% exhaust gas recirculation (by mass), and with a fuel injection pressure of 16 MPa.

The effects of mixing 10% and 23% (by volume) hydrogen in methane on emissions are shown in FIG. 3. Compared to the data from the same engine fuelled with natural gas alone, the data from the tests using a gaseous fuel mixture comprising 10% hydrogen showed that for the injection timings tested, the measured emissions were either the substantially the same or reduced. For example, the measured data indicated that the emissions of PM, tHC and CO were reduced on the order of 5% to 10%. Furthermore, it is noteworthy that there were no detrimental effects to the engine operation or the measured emission levels, resulting from the addition of hydrogen into the fuel. That is, the addition of hydrogen had no significant effect on the emissions of NOx.

It should be noted that the error bars presented in the plotted data are based on the long-term uncertainty estimates, including both analyzer sensitivity and variations in engine operating condition. PM errors are based on calculated uncertainty for the gravimetric samples.

The addition of 23% hydrogen had a greater impact on the emissions than did 10% hydrogen. NOx emissions were increased slightly but were substantially unchanged, while CO, tHC, and $CO_2$ (not shown) emissions were reduced. Due to uncertainties in the PM measurements, the only observed significant influence was at the latest timings, where a substantial reduction in PM was observed with 23% $H_2$ compared to the same timings for the engine fuelled with 100% natural gas or a gaseous fuel mixture with 10% hydrogen. The presence of hydrogen in the combustion zone may have affected pollutant emissions due to an increased concentration of the OH radical. This highly reactive molecule would provide more rapid oxidation of unburned fuel and partial-combustion species such as CO and tHC. Hydrogen has also been shown to effectively reduce local flame extinctions induced by high turbulent strain-rates, events that are thought to generate substantial pollutant emissions. That NOx emissions were slightly increased by hydrogen addition is possibly due to an increase in the prompt-NO mechanism resulting from higher OH concentrations. It may also be due to the more intense combustion with the hydrogen addition.

The low levels of PM being measured were near the detection limit of the instruments. However, the results shown in FIG. 3 show that even for the gaseous fuel mixture with only 10% hydrogen a small reduction in PM was consistently observed. For the gaseous fuel mixture with 23% hydrogen, for earlier injection timings a similar small reduction in PM was observed, but as the injection timing was delayed, more significant reductions in PM emissions were achieved. This is a significant difference in PM emissions from what normally occurs and that is expected from engines fuelled with 100% natural gas when later injection timings are tested. These results show that, unlike an engine fuelled with only methane or natural gas, by using a gaseous fuel mixture comprising methane and at least 23% hydrogen, for a low-load, low-speed engine condition it is possible to delay the timing for fuel injection to achieve significant reductions in NOx emissions without the normal consequence of significantly increasing the emissions of PM.

Figure 4:
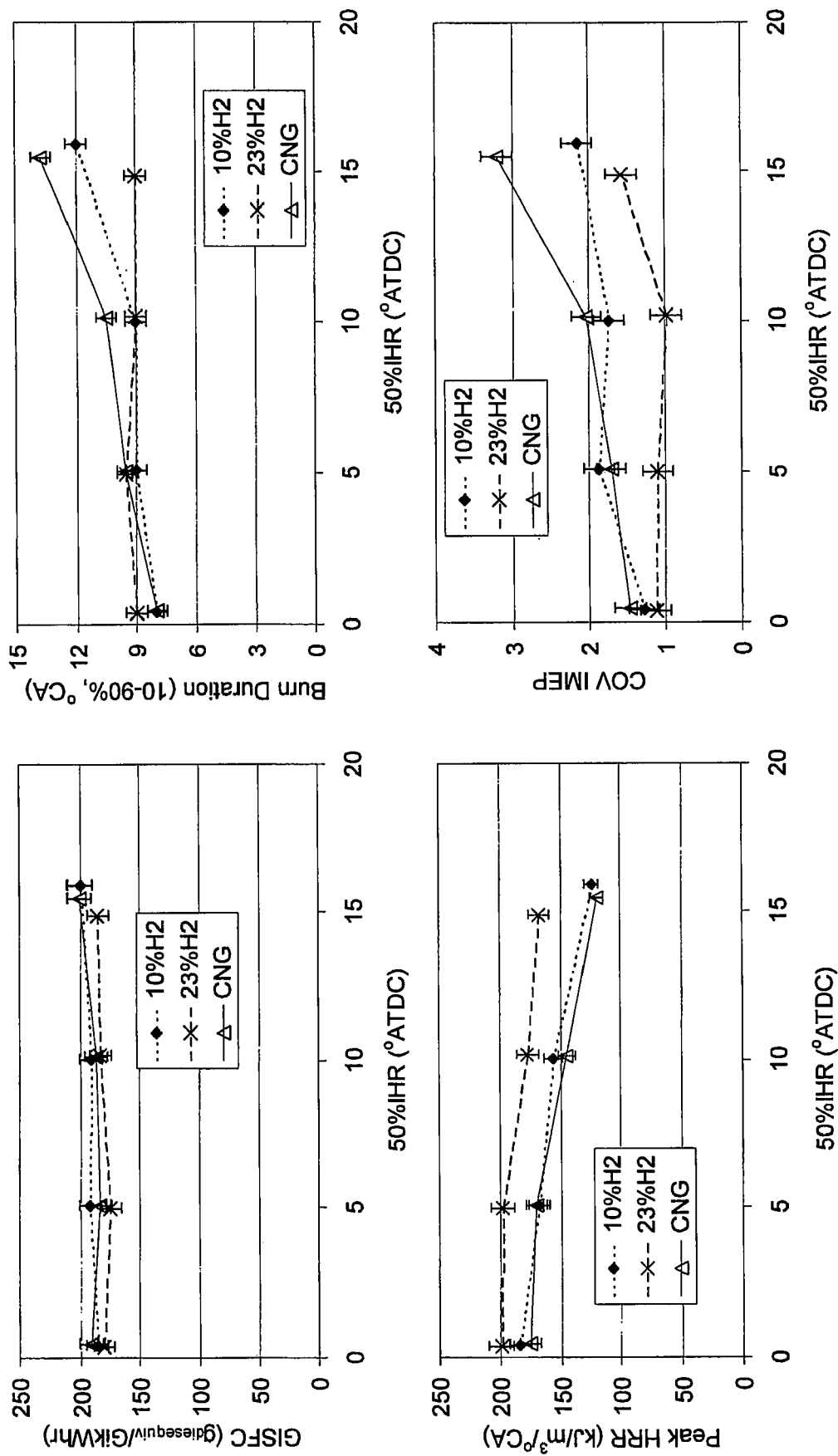
FIG. 4 shows four graphs that plot engine performance characteristics against timing for the mid-point of a combustion heat release for an engine that is fuelled with 100% compressed natural gas, a gaseous fuel mixture of 10% hydrogen and 90% compressed natural gas, and 23% hydrogen and 77% compressed natural gas, with all percentages measured by volume. The engine operating conditions were the same as for the data plotted in FIG. 3.

The effects of 10% and 23% hydrogen mixed with natural gas are compared to the natural gas fuelling case in terms of burn duration (10-90% of integrated heat release), gross indicated specific fuel consumption (GISFC), peak heat-release rate, and coefficient of variation (COV) of the GIMEP in FIG. 4. The GISFC showed no significant influence of either timing or fuel composition. The burn duration was substantially reduced for the hydrogen-fuelling cases at late timing, especially with 23% hydrogen. Interestingly, there was no change in burn duration for the earlier timings. This suggests that different mechanisms may restrict the combustion rate at early and late timings, with a chemical kinetic limit at late timings, compared to a mixing-limited condition for early timings. The peak heat-release rate (corresponding roughly to the maximum rate of chemical energy being released from the fuel) averaged approximately 20% higher for the engine when fuelled with the gaseous fuel mixture comprising 23% hydrogen by volume, compared to when the engine was fuelled with 100% natural gas. The difference when the engine was fuelled with a gaseous fuel mixture comprising only 10% hydrogen was less significant, although there was a slight increase in peak heat release rate (HRR) at most timings. The use of a gaseous fuel mixture comprising hydrogen and methane also substantially reduced the combustion variability (as measured by the COV GIMEP). For the gaseous fuel mixture that comprised 10% hydrogen, a significant reduction in variability was observed at the later combustion timings. For the gaseous fuel mixture that comprised 23% hydrogen, reduced variability was seen at all combustion timings, although the reduction in variability was greatest for later combustion timings. This reduction in combustion variability can be due to increased flame stability caused by the addition of hydrogen, which can contribute directly to the observed reduction in CO and tHC emissions.

Figure 5:
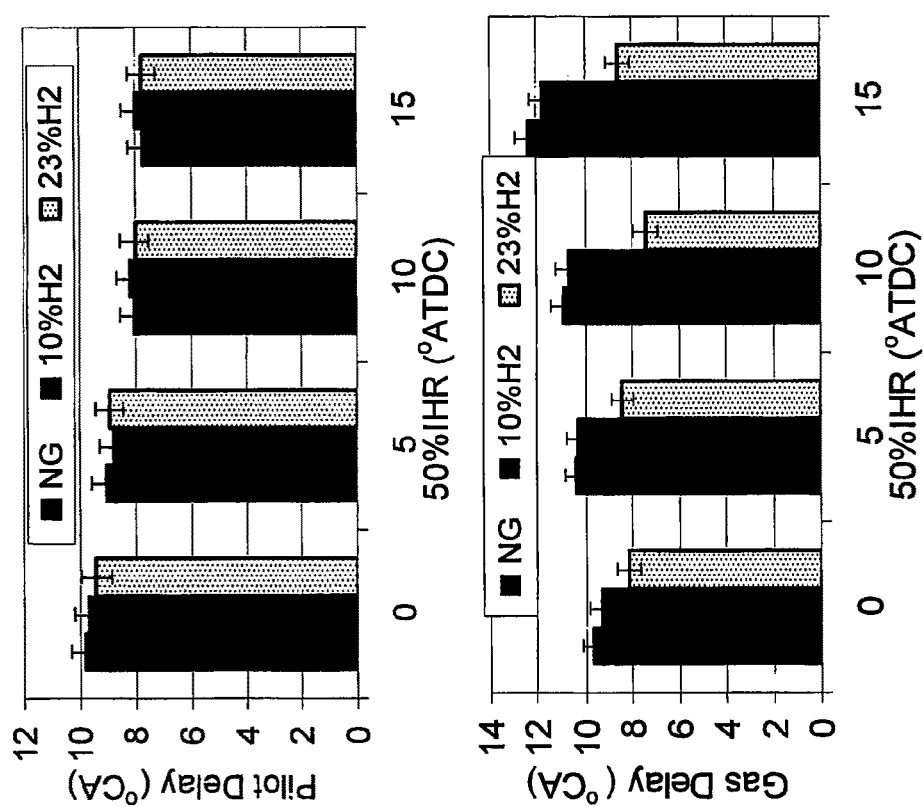
FIG. 5 shows two bar graphs that plot pilot and gaseous fuel ignition delay for an engine that is fuelled with 100% compressed natural gas, a gaseous fuel mixture of 10% hydrogen and 90% compressed natural gas, and 23% hydrogen and 77% compressed natural gas, with all percentages measured by volume. The engine operating conditions were the same as for the data plotted in FIGS. 3 and 4.

FIG. 5 shows two bar charts that plot pilot and gaseous fuel ignition delay for engines fuelled with different gaseous fuel mixtures. Again, the data was collected from an engine operating with the same experimental test conditions: 800 RPM; 6 bar GIMEP; 0.5 $\phi$; 40% EGR, and an injection pressure of 16 MPa. As shown in FIG. 5, for the experimental test condition, the addition of hydrogen to natural gas had no significant effect on the pilot ignition delay. When the engine was fuelled with a gaseous fuel mixture comprising 10% hydrogen and 90% natural gas, there was a slight reduction in the gas ignition delay. An on-average 20% reduction in gas ignition delay was observed when the engine was fuelled with a gaseous fuel mixture comprising 23% hydrogen. These delays are defined as the time between the commanded start of injection and the observed start of combustion. As such, they include any physical delay within the injector, as well as both mixing and chemical delay times for the injected fuel. The commanded start-of-injection was a recorded value while the start-of-combustion timing was determined by examination of the heat-release rate. The start of pilot combustion was identified as the first significant increase in energy release. The uncertainty in these plots was estimated at ±0.5 crank angle degrees (° CA), representing the uncertainty in the crank-angle encoder. The start of gas combustion was located as the point at which a rapid farther increase in heat-release rate was observed. Examples of these locations are shown in the heat-release plot in FIG. 6.

The observed shorter gas ignition delay time is consistent with premixed and non-premixed auto-ignition of methane tests, previously reported in 1997 by C. G. Fotache, T. G. Kreutz and C. K. Law in "Ignition of Hydrogen-Enriched Methane by Heated Air", published in Combustion and Flame, Vol. 110, pp. 429-440, which showed that hydrogen addition could substantially reduce ignition delay times. However, the work of Fotache et al. does not relate to a non-premixed jet being ignited by a pilot flame, and therefore is not directly comparable to the presently disclosed method and apparatus. Contrary to the work of Fotache et al. that suggested that even at 10% $H_2$, a noticeable reduction in ignition delay occurred, the experimental data shown in FIG. 5 indicates that for the subject internal combustion engine, which employed pilot fuel to assist with ignition of the directly injected main fuel, a more substantial quantity of hydrogen was required before a significant effect was detected. Because the combustion process is complex, the shorter gas ignition delay can have a number of effects on the combustion process. First, the time available for mixing is substantially reduced. While hydrogen can mix somewhat faster, due to its higher diffusivity, the methane diffusion rate is essentially constant. This can lead to less methane being over-mixed during the ignition delay period, resulting in a reduction in tHC emissions. The shorter ignition delay can also result in less air mixing into the gaseous jet during the pre-combustion period, resulting in a richer jet core during the combustion process. This richer jet can result in an increase in soot formation. The reduction in PM (which is not as substantial as the reductions in CO and tHC) may be a result of increases in both the soot formation (caused by the richer non-premixed jet) and oxidation through the OH radical processes.

Figure 6:
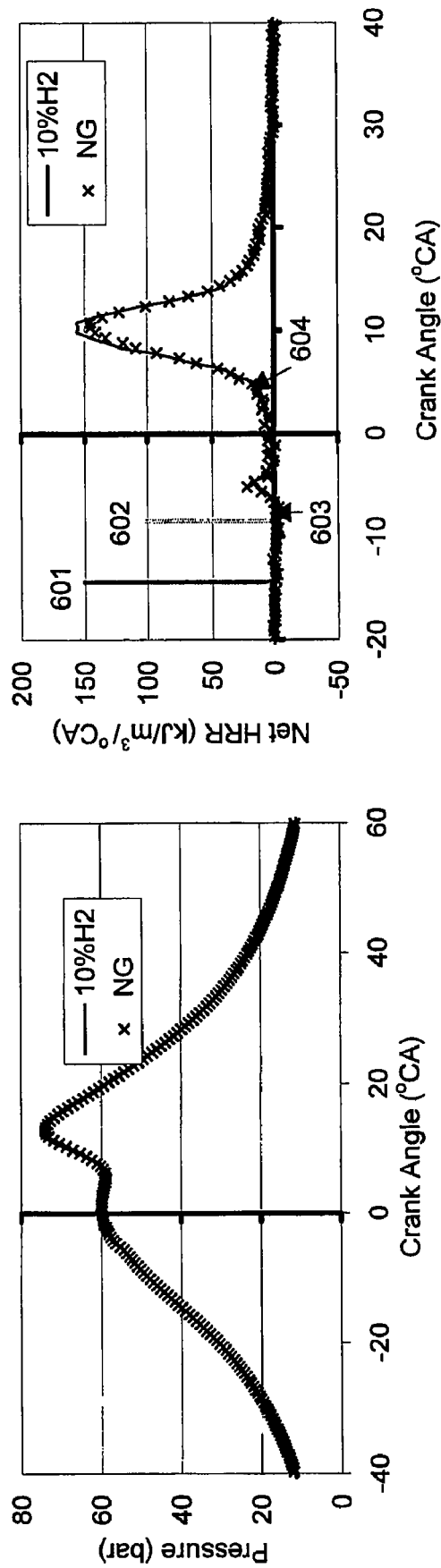
FIG. 6 shows plots of in-cylinder pressure and heat release rate for an engine that is fuelled with 100% compressed natural gas, and a gaseous fuel mixture of 10% hydrogen and 90% compressed natural gas with percentages for the gaseous fuel mixture measured by volume and the timing for the mid-point of the integrated heat release occurring at 10 crank angle degrees after top dead center. The engine operating conditions were the same as for the data plotted in FIGS. 3-5.
Figure 7:
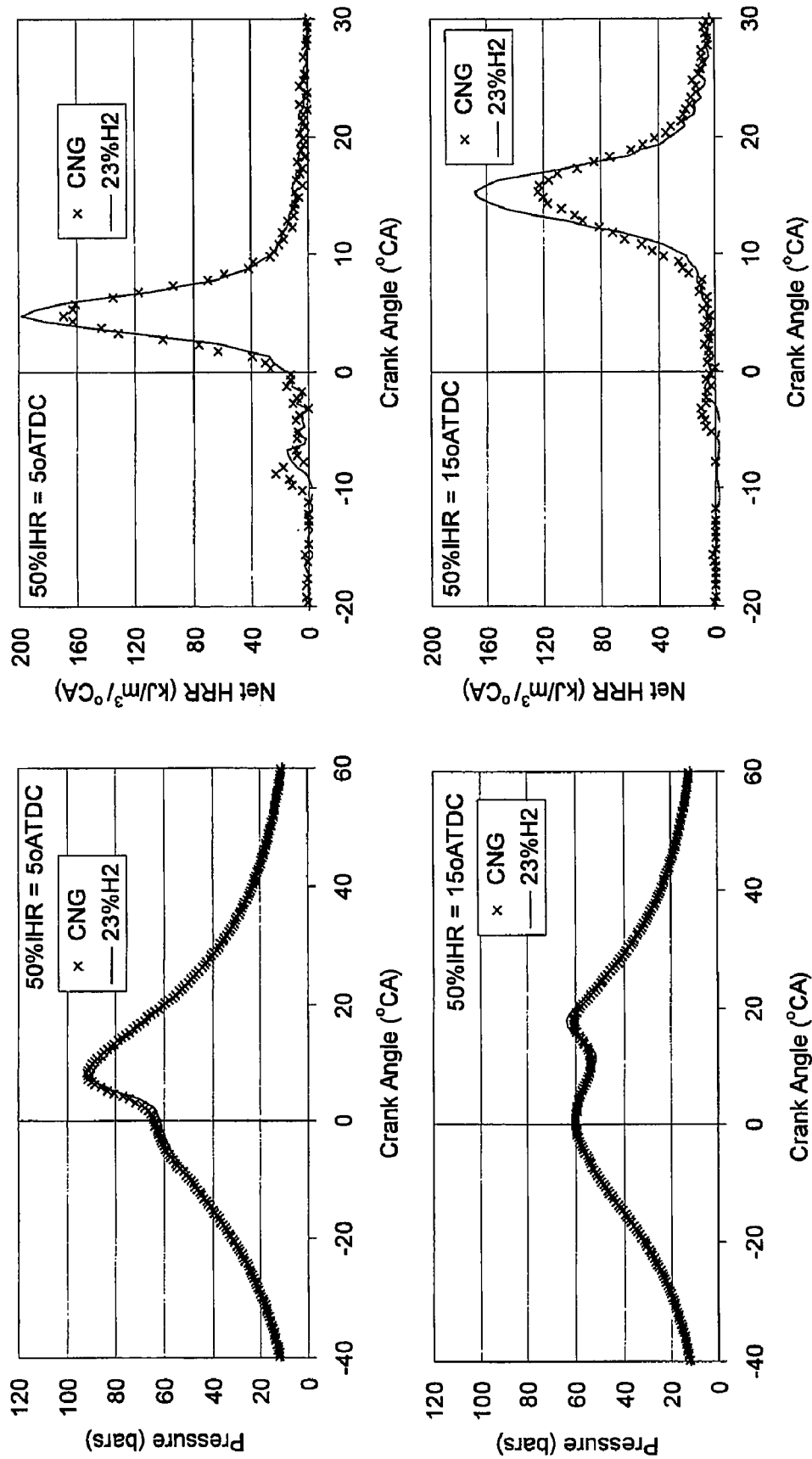
FIG. 7 is plots of in-cylinder pressure and heat release rate for an engine that is fuelled with 100% compressed natural gas, and a gaseous fuel mixture of 23% hydrogen and 77% compressed natural gas, with percentages for the gaseous fuel mixture measured by volume. In the upper two graphs, the timing for the mid-point of the integrated heat release occurs at 5 crank angle degrees after top dead center and in the lower two graphs the timing for the mid-point of the integrated heat release occurs at 15 crank angle degrees after top dead center. The engine operating conditions were the same as for the data plotted in FIGS. 3-6.

FIG. 6 shows that for an engine fuelled with a gaseous fuel comprising 10% hydrogen and 90% natural gas, there was no significant difference observed in the in-cylinder conditions, as represented by the pressure trace and heat-release rate compared to when the engine was fuelled with 100% natural gas. In this example, the timing shown by 601 is when the pilot fuel injection begins, while 602 shows the timing for when the injection of the gaseous fuel mixture begins. The first increase in net heat release rate at the timing shown by 603 indicates the start of combustion for the pilot fuel and the second increase in the net heat release rate shown by 604 indicates the timing for start of combustion for the gaseous fuel mixture. While the pressure traces and heat-release rates for the 0, 5, and 15° ATDC timings are not shown, similar results were observed at these other timings. When the engine was fuelled with a gaseous fuel mixture comprising 23% hydrogen and 77% natural gas a more significant effect on the in-cylinder conditions was observed. For the data plotted in FIG. 7, to maintain the same combustion timing for both of the plotted fuelling conditions (100% natural gas and a gaseous fuel mixture comprising 23% hydrogen and 77% natural gas), to compensate for the shorter ignition delay the timing for injecting the gaseous fuel mixture was delayed by about 4 crank angle degrees. FIG. 7 shows that for an engine fuelled with a gaseous fuel mixture comprising hydrogen and natural gas, the heat release rate changes as a function of both fuel composition and fuel injection timing. That is, the peak heat-release rate was substantially higher at all the combustion timings when the engine was fuelled with a gaseous fuel mixture comprising hydrogen, with peak heat-release rate increasing with increasing proportions of hydrogen in the fuel mixture. The effect of peak heat-release rates being higher for engines fuelled with fuel mixtures comprising hydrogen was relatively consistent, although the increase in heat release rate is more substantial at 15° ATDC than at the earlier timings. The effect of fuel injection timing was observed to be consistent for both natural gas and gaseous fuel mixtures of hydrogen and natural gas, in that retarding injection timing resulted in reductions in the heat release rate.

For the bulk of the testing, the mid-point of the heat release (50% IHR) was held constant by varying the start-of-injection timing (both pilot and main fuel timings shifted equivalently, as the relative delay between the gas and diesel injections was held constant). While this technique maximized comparability of the combustion timing, it resulted in variations in the combustion timing. To study this, experiments were conducted to collect two sets of data. One set of data was collected from the engine when it was operated with the same start-of-injection timing (pilot and gas) as for when the engine was fuelled with 100% natural gas, except that the engine was fuelled with a gaseous fuel mixture comprising 23% hydrogen and 77% natural gas. A second set of data was collected with the same fuelling condition but with adjustments to the timing for start-of-injection to maintain a constant combustion timing for the mid-point of the integrated heat release.

Figure 8:
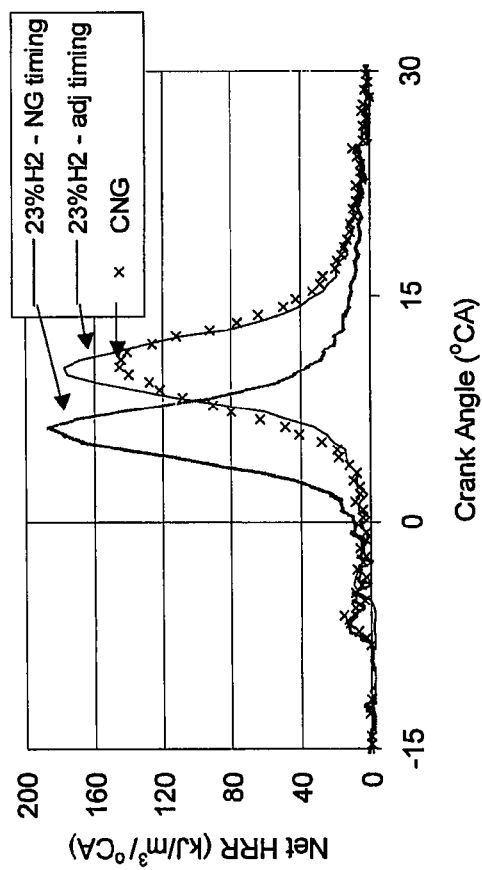
FIG. 8 plots in-cylinder pressure and heat release rate for constant and adjusted timing conditions for an engine fuelled with 100% compressed natural gas, and a gaseous fuel mixture of 23% hydrogen and 77% compressed natural gas, with percentages for the gaseous fuel mixture measured by volume. The engine operating conditions were the same as for the data plotted in FIGS. 3-7.
Figure 8:
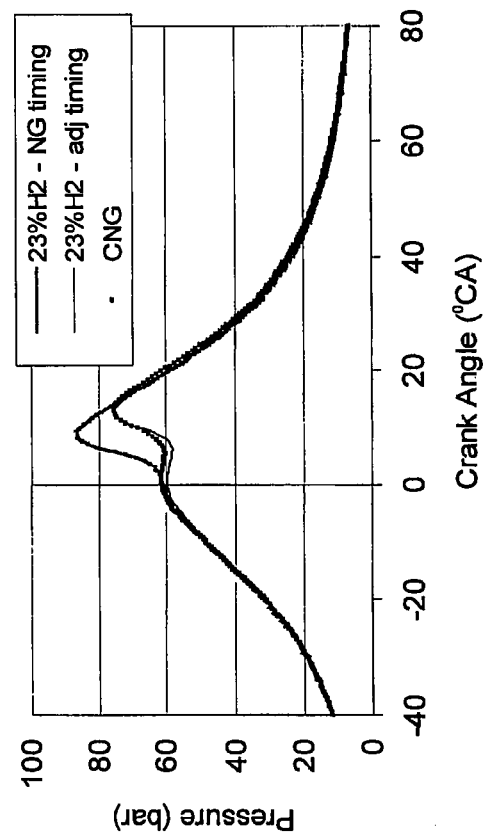
Figure 9:
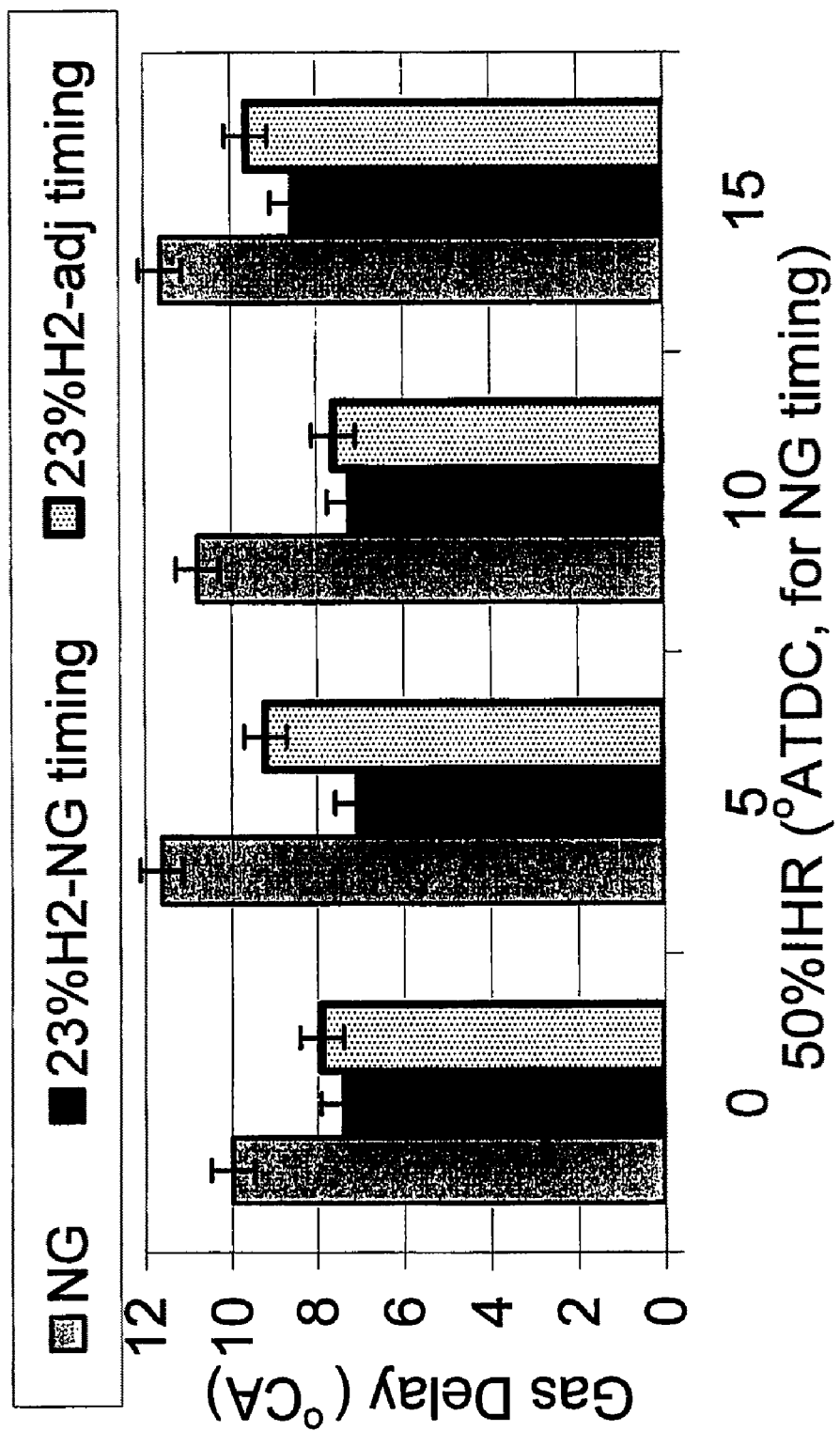
FIG. 9 is a bar graph that plots gaseous fuel ignition delay in crank angle degrees against timing for the mid-point of integrated heat release for 100% natural gas, and a gaseous fuel mixture of 23% hydrogen and 77% compressed natural gas, with percentages for the gaseous fuel mixture measured by volume. The plotted data shows the gaseous fuel ignition delay when the gaseous fuel mixture is injected with the same timing that is employed when the engine is fuelled with 100% natural gas, and the effect on gaseous fuel ignition delay when timing is adjusted. The engine operating conditions were the same as for the data plotted in FIGS. 3-8.

The effects of these timing adjustments on the in-cylinder performance are shown in FIG. 8, which shows the in-cylinder pressure and heat-release rate for the following three conditions: (1) 100% natural gas; (2) a gaseous fuel mixture comprising 23% hydrogen and 77% natural gas, using the same timing as for 100% natural gas; and, (3) a gaseous fuel mixture comprising 23% hydrogen and 77% natural gas, but with the timing for start-of-injection adjusted to maintain the same timing for the mid-point of the integrated heat release (50% IHR) as for 100% natural gas. This data is for the condition where the 50% IHR was set to 10 crank angle degrees after top dead center (° ATDC), for the engine fuelled with 100% natural gas and for the engine fuelled with 23% hydrogen with the adjusted timing for start-of-injection. The addition of hydrogen to the fuel substantially reduced the gas ignition delay time, as shown by the significantly earlier main combustion event, while the pilot start-of-combustion (shown by the first increase on the heat-release plot) was substantially constant for all three conditions. Similar results were seen at all timings for the mid-point of the integrated heat release, as shown in FIG. 9. A shorter gas ignition delay was observed for the engine when it was fuelled with a gaseous fuel mixture comprising hydrogen under both fixed and adjusted timings. It is thought that the gas ignition delay was shorter for the fixed timing condition because the ignition was occurring earlier in the cycle. The mid-point for the integrated heat release was advanced by approximately 4 crank angle degrees (° CA) for all the constant injection timing cases. The effects on emissions (not shown) were consistent with the effects of advancing the timing by approximately 4° CA.

The injection pressure of 16 MPa that was used to collect most of the experimental data is lower than what is normally used for gaseous-fuelled engines that directly inject gaseous fuels such as natural gas into the combustion chamber of an internal combustion engine. Generally, higher injection pressures are considered to be more desirable and injection pressures between 19 MPa and 30 MPa are more typical. To test the effect of injection pressure on the observed results, some of the experiments were repeated with a fuel injection pressure at 20 MPa. While this was still substantially below the highest achievable injection pressures, it provided a reasonable injection rail/peak cylinder pressure ratio, due to the low in-cylinder pressure. The minimum fuel/cylinder pressure ratio at the earliest combustion timing (where the peak cylinder pressure was highest) was 2:1 at 20 MPa, compared to 1.6:1 for the 16 MPa injection. For later combustion timings, the ratio was increased to as much as 3.3 (compared to 2.7 for the 16 MPa case). These ratios do not represent the actual ratio between the fuel at the injector nozzle and the in-cylinder condition, as the cylinder pressure changed over the injection period, while the pressure of the gas exiting the nozzle was substantially lower than the rail pressure due to flow losses within the injector body and gas dynamics at the nozzle outlet. However, these ratios do provide a means for characterizing the effect of injection pressure and provide a basis for comparing such effects between engines that are fuelled with 100% natural gas, and engines that are fuelled with a gaseous fuel mixture comprising hydrogen and methane.

Figure 10:
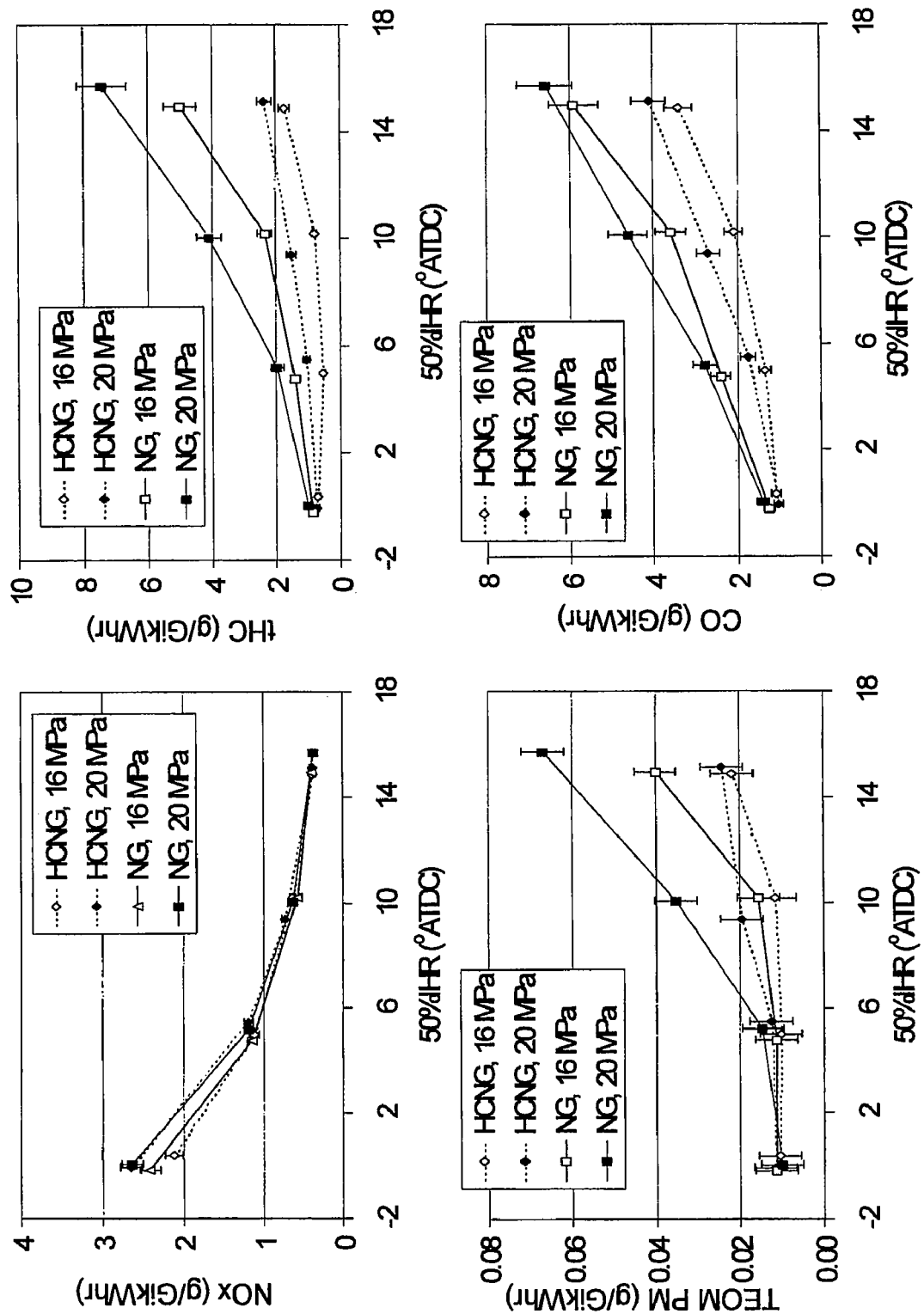
FIG. 10 plots engine emissions against the timing for the mid-point of the integrated heat release, showing the effect of increasing injection pressure from 16 MPa to 20 MPa for an engine fuelled with 100% compressed natural gas, and a gaseous fuel mixture of 23% hydrogen and 77% compressed natural gas, with percentages for the gaseous fuel mixture measured by volume. Other than the different fuel injection pressures, the engine operating conditions were the same as for the data plotted in FIGS. 3-9.
Figure 11:
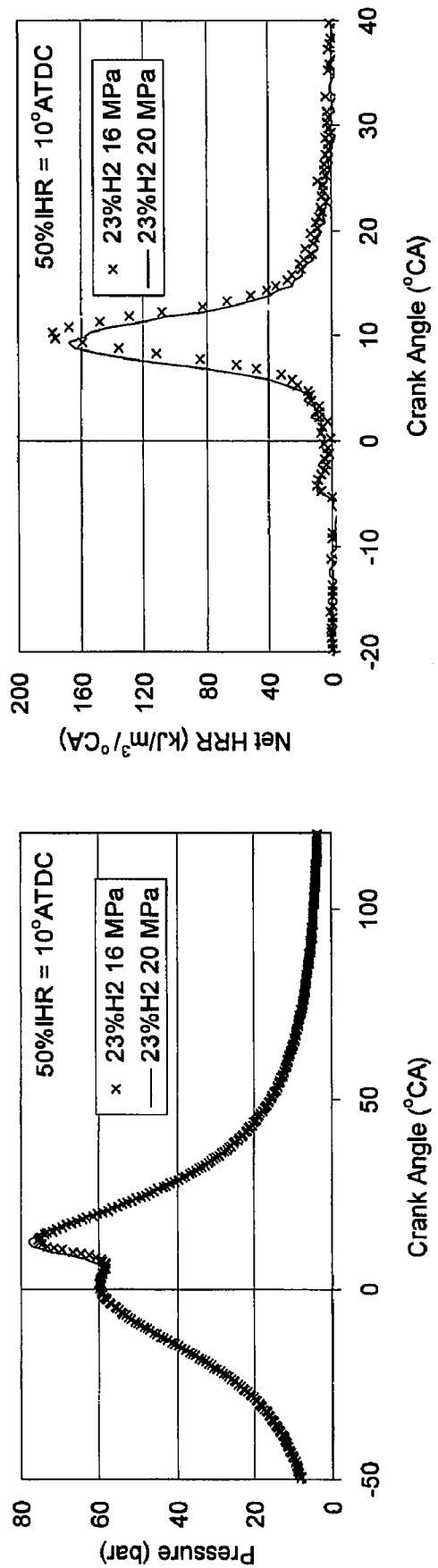
FIG. 11 plots in-cylinder pressure and heat release rate against crank angle degrees for fuel injection pressures of 16 MPa and 20 MPa for an engine fuelled with 100% compressed natural gas, and a gaseous fuel mixture of 23% hydrogen and 77% compressed natural gas, with percentages for the gaseous fuel mixture measured by volume. The engine operating conditions were the same as for the data plotted in FIGS. 3-9.

The effect of increasing the injection pressure on emissions is shown in FIG. 10. The higher injection pressure tended to increase CO, PM, and tHC emissions, while NOx and GISFC were not affected. The results can be seen to be consistent for both natural gas and hydrogen-methane blend fuelling. That the injection pressure had little impact on the in-cylinder performance is shown in FIG. 11, which plots a pressure trace and the heat release rate for 16 and 20 MPa, for an engine fuelled with a gaseous fuel mixture comprising 23% hydrogen and 77% natural gas by volume. It was surprising that the higher injection pressure resulted in slightly increased levels of PM, tHC, and CO emissions compared to engine fuelled with the same gaseous fuel mixture but with lower injection pressures. However, the experimental results do show that hydrogen addition resulted in reductions in the emissions of PM, total hydrocarbons (tHC) and carbon monoxide (CO), without negative impact on emissions of NOx, and that this result was generally consistent at both injection pressures. Accordingly, these results indicate that hydrogen addition has a positive impact on emissions over a range of fuel injection pressures.

From the experimental data collected it is possible to determine certain trends relating to engine emissions and combustion stability arising from fuel composition and combustion timing. That is, these trends can be extrapolated from the data that was collected when the engine was operated with gaseous fuel mixtures comprising 100% natural gas (and 0% hydrogen), 90% natural gas and 10% hydrogen, and 77% natural gas and 23% hydrogen. When the engine was fuelled with 90% natural gas and 10% hydrogen, improvements were observed in combustion stability and engine emissions were substantially the same or slightly reduced compared to when the same engine was fuelled with 100% natural gas. When the same engine was fuelled with 77% natural gas and 23% hydrogen, there were greater improvements in combustion stability and more substantial improvements in engine emissions. Although the results are not plotted in the figures, experiments were also conducted in which the engine was fueled with up to 35% hydrogen by volume (at STP), and at such higher hydrogen percentages the effect on emissions continued to be beneficial. However, hydrogen is harder to compress compared to natural gas and the higher volume occupied by hydrogen compared to methane for the same amount of energy introduces volumetric flow capacity challenges for gaseous fuel mixtures with higher percentages of hydrogen. From the experimental data collected, the levels of emissions observed from the conducted experiments, and the pre-existing knowledge base relating to the combustion of gaseous fuel mixtures in other engines, it can be reasonably determined that, compared to an engine fuelled with 100% natural gas, improved combustion stability and improved engine emissions can be achieved with gaseous fuel mixtures comprising hydrogen in concentrations from 5% to at least 60% by volume. From the observed trends plotted in FIGS. 3 and 4, higher hydrogen concentrations can yield better combustion stability (reduced combustion variability) and lower emissions, but these advantages can be offset by other factors such as higher hydrogen percentages requiring increased volumetric flow requirements, or the cost and availability of hydrogen. For higher percentages of hydrogen, the properties of the gaseous fuel mixture can also change because hydrogen has a lower lubricity compared to natural gas. In some cases, the preferred gaseous fuel mixture can be between 10% and 50% hydrogen or an even narrower ranges, such as between 15% and 40% hydrogen mixed with natural gas or between 20% and 35% hydrogen mixed with natural gas. By way of specific examples, the gaseous fuel mixture can comprise methane and hydrogen with hydrogen content expressed as a percentage by volume being one of 12%, 14%, 16%, 18%, 20%, 22%, 23%, 24%, 25%, 26%, 28%, 30%, 32%, 34%, 35%, 36%, 38%, 40%, 42%, 44%, 46%, 48%, 50% and percentages therebetween.

From the experimental data, trends can also be determined relating to combustion timing. For an engine fuelled with a gaseous fuel mixture comprising hydrogen and methane, combustion stability can be achieved over a broader range compared to the same engine fuelled with 100% natural gas. For an engine fuelled with a gaseous fuel mixture comprising 10% hydrogen, this improved stability was observed to occur when timing for the mid-point of the integrated heat release occurred 10 crank angle degrees after top dead center and later. For the same engine fuelled with a gaseous fuel mixture comprising 23% hydrogen, an improvement in combustion stability was observed as early as when the mid-point of the integrated heat release occurred 5 crank angle degrees after top dead center, with improvements to combustion stability increasing further still for later combustion timings. From the experimental data it can be concluded that an engine fuelled with a gaseous fuel mixture comprising methane and at least 10% hydrogen by volume, can equal or better the combustion stability and emissions from the same engine fuelled with 100% natural gas. Even though most of the data was collected for one engine operating condition, since the selected engine operating condition was one that is normally associated with high engine emissions it is expected that the tested gaseous fuel mixtures comprising at least 10% hydrogen and a majority of methane by volume will produce similar or better emissions and combustion stability compared to the same engine fuelled with 100% natural gas, when the engine is operated at different engine conditions.

In summary, the experimental results show that an internal combustion engine with direct injection of a gaseous fuel mixture comprising hydrogen and methane can be operated to reduce emissions and improve combustion stability compared to the same engine fuelled with 100% natural gas. The graph of coefficient of variation of the GIMEP against combustion timing in FIG. 4 shows that the addition of hydrogen results in a substantial reduction in the combustion variability. The experimental results also show that while hydrogen addition can increase the peak combustion heat release rate, indicating higher combustion temperatures, the addition of hydrogen did not result in increased levels of NOx emissions compared to when the engine was operated under the same conditions but fuelled with 100% natural gas. The results further show that hydrogen addition can allow later combustion timings because the level of PM emissions at later combustion timings are reduced compared to when the engine was fuelled with 100% natural gas. The experimental data confirmed that like engines fuelled with 100% natural gas, the levels of NOx emissions decrease with later combustion timings for engines fuelled with gaseous mixtures comprising hydrogen and methane. Whereas with engines fuelled with 100% natural gas, the steep increase in PM emissions for later combustion timings establishes a limit to how much combustion timing can be retarded, the experimental results show that for engines fuelled with a gaseous fuel mixture comprising hydrogen and natural gas, later combustion timings are possible because PM emissions increase at a much shallower slope as combustion timing is delayed. In addition, it was found that a characteristic of gaseous fuel mixtures comprising hydrogen and methane that were directly injected into a combustion chamber of an internal combustion engine was that the gaseous fuel mixtures ignited with a shorter ignition delay compared to that of natural gas without the addition of hydrogen. For the tested engine condition the shorter ignition delay results in the combustion timing being advanced about 4 crank angle degrees, which resulted in higher peak in-cylinder pressures and higher peak heat release rates if the same injection timing used for a natural gas engine was maintained. It was determined that timing adjustments can be made so that combustion characteristics match those of engines fuelled with 100% natural gas.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of fuelling an internal combustion engine, the method comprising:
    introducing a gaseous fuel mixture directly into a combustion chamber of said engine, wherein said gaseous fuel mixture comprises methane;
    introducing hydrogen into said combustion chamber, thereby adding hydrogen to said gaseous fuel mixture, wherein said hydrogen represents between 5% and 60% by volume of said gaseous fuel mixture at standard temperature and pressure;
    maintaining a gaseous fuel mixture rail to peak in-cylinder pressure ratio of at least 1.5:1 when introducing the gaseous fuel mixture into said combustion chamber for at least one engine operating condition;
    the method further comprising premixing said hydrogen with intake air and introducing said hydrogen into said combustion chamber during an intake stroke of said piston.

2. The method of claim 1 wherein said gaseous fuel mixture comprises between 10% and 50% hydrogen by volume at standard temperature and pressure.

3. The method of claim 1 wherein said gaseous fuel mixture comprises between 15% and 40% hydrogen by volume at standard temperature and pressure.

4. The method of claim 1 wherein said gaseous fuel mixture comprises between 20% and 35% hydrogen by volume at standard temperature and pressure.

5. The method of claim 1 further comprising injecting a pilot fuel directly into said combustion chamber about 1 millisecond before start of injection of said gaseous fuel mixture.

6. The method of claim 5 wherein said pilot fuel is a liquid fuel with a cetane number between 40 and 70.

7. The method of claim 6 wherein said liquid fuel is diesel fuel.

8. The method of claim 5 wherein over an engine operating map said pilot fuel is on average between 3% and 10% of the fuel that is consumed by said engine on an energy basis.

9. The method of claim 5 wherein over an engine operating map said pilot fuel is on average between 4% and 6% of the fuel that is consumed by said engine on an energy basis.

10. The method of claim 1 further comprising heating a hot surface inside said combustion chamber to assist with igniting said gaseous fuel mixture.

11. The method of claim 10 wherein said hot surface is provided by a glow plug and said method further comprises electrically heating said glow plug.

12. The method of claim 1 further comprising controlling the proportions of hydrogen and methane in said gaseous fuel mixture as a function of engine operating conditions.

13. The method of claim 1 further comprising maintaining a fuel rail to peak in-cylinder pressure ratio of at least 2:1 when introducing said gaseous fuel mixture into said combustion chamber for at least one engine operating condition.

14. The method of claim 1 further comprising maintaining a choked flow condition at a nozzle orifice of a fuel injection valve when introducing said gaseous fuel mixture into said combustion chamber.

15. The method of claim 1 further comprising injecting said gaseous fuel mixture into said combustion chamber with an injection pressure that is at least 16 MPa (about 2350 psia).

16. The method of claim 1 further comprising injecting said gaseous fuel mixture into said combustion chamber with an injection pressure that is at least 20 MPa (about 2900 psia).

17. The method of claim 1 wherein in the course of a compression stroke, an intake charge inside said combustion chamber is compressed by a ratio of at least about 14:1.

18. The method of claim 1 wherein methane is the largest constituent of said gaseous fuel mixture by volume at standard temperature and pressure.

19. A method of fuelling an internal combustion engine, the method comprising:
   introducing a gaseous fuel mixture directly into a combustion chamber of said engine, wherein said gaseous fuel mixture comprises methane;
   introducing hydrogen into said combustion chamber, thereby adding hydrogen to said gaseous fuel mixture, wherein said hydrogen represents between 5% and 60% by volume of said gaseous fuel mixture at standard temperature and pressure;
   maintaining a gaseous fuel mixture rail to peak in-cylinder pressure ratio of at least 1.5:1 when introducing the gaseous fuel mixture into said combustion chamber for at least one engine operating condition;
   the method further comprising introducing said hydrogen directly into said combustion chamber separately from said gaseous fuel mixture.

20. The method of claim 19 wherein said gaseous fuel mixture comprises between 20% and 35% hydrogen by volume at standard temperature and pressure.

21. The method of claim 19 further comprising injecting a pilot fuel directly into said combustion chamber about 1 millisecond before start of injection of said gaseous fuel mixture.

22. The method of claim 21 wherein said pilot fuel is a liquid fuel with a cetane number between 40 and 70.

23. The method of claim 22 wherein said liquid fuel is diesel fuel.

24. The method of claim 21 wherein over an engine operating map said pilot fuel is on average between 3% and 10% of the fuel that is consumed by said engine on an energy basis.

25. The method of claim 21 wherein over an engine operating map said pilot fuel is on average between 4% and 6% of the fuel that is consumed by said engine on an energy basis.

26. The method of claim 19 further comprising heating a hot surface inside said combustion chamber to assist with igniting said gaseous fuel mixture.

27. The method of claim 26 wherein said hot surface is provided by a glow plug and said method further comprises electrically heating said glow plug.

28. The method of claim 19 further comprising controlling the proportions of hydrogen and methane in said gaseous fuel mixture as a function of engine operating conditions.

29. The method of claim 19 further comprising maintaining a fuel rail to peak in-cylinder pressure ratio of at least 2:1 when introducing said gaseous fuel mixture into said combustion chamber for at least one engine operating condition.

30. The method of claim 19 further comprising maintaining a choked flow condition at a nozzle orifice of a fuel injection valve when introducing said gaseous fuel mixture into said combustion chamber.

31. The method of claim 19 further comprising injecting said gaseous fuel mixture into said combustion chamber with an injection pressure that is at least 16 MPa (about 2350 psia).

32. The method of claim 19 further comprising injecting said gaseous fuel mixture into said combustion chamber with an injection pressure that is at least 20 MPa (about 2900 psia).

33. The method of claim 19 wherein in the course of a compression stroke, an intake charge inside said combustion chamber is compressed by a ratio of at least about 14:1.

34. The method of claim 19 wherein methane is the largest constituent of said gaseous fuel mixture by volume at standard temperature and pressure.

35. An internal combustion engine capable of being fuelled with a gaseous fuel mixture comprising methane and between 5% and 60% hydrogen by volume at standard temperature and pressure, the engine comprising:
   a combustion chamber defined by a cylinder, a cylinder head, and a piston movable within said cylinder;
   a fuel injection valve with a nozzle that is disposed within said combustion chamber, said fuel injection valve being operable to introduce said gaseous fuel mixture directly into said combustion chamber;
   a pressurizing device and piping for delivering said gaseous fuel mixture to said injection valve with a ratio of fuel rail to peak in-cylinder pressure being at least 1.5:1 for at least one engine operating condition;
   an electronic controller in communication with an actuator for said fuel injection valve for controlling timing for operating said fuel injection valve; and
   a second fuel injection valve that is operable to introduce a pilot fuel directly into said combustion chamber;
   wherein said second fuel injection valve is integrated into a valve assembly that also comprises said fuel injection valve for introducing said gaseous fuel mixture; and
   wherein said second fuel injection valve and said fuel injection valve for introducing said gaseous fuel mixture can be independently actuated and said gaseous fuel mixture is injectable into said combustion chamber through a first set of nozzle orifices, which are different from a second set of nozzle orifices through which said pilot fuel is injectable into said combustion chamber.

36. The engine of claim 35 wherein said engine has a compression ratio of at least 14:1.

37. The engine of claim 35 wherein said electronic controller is programmable to time introduction of said gaseous fuel mixture into said combustion chamber so that the midpoint of an integrated combustion heat release occurs between 2 and 30 crank angle degrees after top dead center.

38. The engine of claim 35 wherein said electronic controller is programmable to time introduction of said gaseous fuel mixture into said combustion chamber so that the mid-point of an integrated combustion heat release occurs between 5 and 15 crank angle degrees after top dead center.

39. The engine of claim 35 further comprising an ignition plug disposed within said combustion chamber that is operable to assist with ignition of the gaseous fuel mixture.

40. The engine of claim 39 wherein said ignition plug is a glow plug that is electrically heatable to provide a hot surface for assisting with ignition of said gaseous fuel mixture.

41. The engine of claim 39 wherein said ignition plug is a spark plug.

42. The method of claim 19 wherein said gaseous fuel mixture comprises between 10% and 50% hydrogen by volume at standard temperature and pressure.

43. The method of claim 19 wherein said gaseous fuel mixture comprises between 15% and 40% hydrogen by volume at standard temperature and pressure.

44. An internal combustion engine capable of being fuelled with a gaseous fuel mixture comprising methane and hydrogen, the engine comprising:

- a combustion chamber defined by a cylinder, a cylinder head, and a piston movable within said cylinder;
- a first fuel injection valve with a nozzle disposed within said combustion chamber, wherein said fuel injection valve is operable to introduce methane directly into said combustion chamber;
- a second fuel injection valve with a nozzle disposed within an intake air manifold, wherein said second fuel injection valve is operable to introduce hydrogen into said intake air manifold from which said hydrogen can flow into said combustion chamber; and
- an electronic controller electrically connected to an actuator for each one of said first and second fuel injection valves for controlling respective timing for operating said first and second fuel injection valves.

45. The engine of claim 44 further comprising a pressurizing device and piping for delivering said methane to said first injection valve with a ratio of fuel rail pressure to peak in-cylinder pressure being at least 1.5:1 for at least one engine operating condition.

46. The engine of claim 44 wherein said engine has a compression ratio of at least 14:1.

\* \* \* \* \*

UNITED STATES PATENT AND TRADEMARK OFFICE
CERTIFICATE OF CORRECTION

PATENT NO. : 8,091,536 B2  
APPLICATION NO. : 12/235084  
DATED : January 10, 2012  
INVENTOR(S) : Sandeep Munshi et al.

Page 1 of 1

It is certified that error appears in the above-identified patent and that said Letters Patent is hereby corrected as shown below:

Title Page, Item (73), "Assignee: Westport Power Inc., Vancouver, BC (CA)", please insert --University of British Columbia, Vancouver, B.C., Canada--.

Signed and Sealed this  
Twenty-second Day of January, 2013

David J. Kappos  
*Director of the United States Patent and Trademark Office*